United States Patent
Noguchi et al.

(10) Patent No.: US 11,767,467 B2
(45) Date of Patent: Sep. 26, 2023

(54) PHOTOCHROMIC COMPOUND AND CURABLE COMPOSITION CONTAINING SAID PHOTOCHROMIC COMPOUND

(71) Applicant: TOKUYAMA CORPORATION, Shunan (JP)

(72) Inventors: Takao Noguchi, Tsukuba (JP); Junji Takenaka, Tsukuba (JP); Junji Momoda, Tsukuba (JP); Takayoshi Kawasaki, Tsukuba (JP); Yasutomo Shimizu, Tsukuba (JP); Masayuki Miyazaki, Tsukuba (JP)

(73) Assignee: TOKUYAMA CORPORATION, Shunan (JP)

( * ) Notice: Subject to any disclaimer, the term of this patent is extended or adjusted under 35 U.S.C. 154(b) by 488 days.

(21) Appl. No.: 17/258,375

(22) PCT Filed: Jul. 18, 2019

(86) PCT No.: PCT/JP2019/028358
§ 371 (c)(1),
(2) Date: Jan. 6, 2021

(87) PCT Pub. No.: WO2020/017610
PCT Pub. Date: Jan. 23, 2020

(65) Prior Publication Data
US 2021/0292641 A1  Sep. 23, 2021

(30) Foreign Application Priority Data
Jul. 20, 2018 (JP) .................. 2018-136374

(51) Int. Cl.
*C09K 9/02* (2006.01)
*C08G 65/333* (2006.01)
*G02B 1/04* (2006.01)

(52) U.S. Cl.
CPC .......... *C09K 9/02* (2013.01); *C08G 65/33396* (2013.01); *C09K 2211/1475* (2013.01); *G02B 1/04* (2013.01)

(58) Field of Classification Search
CPC .... C09K 9/02; C09K 2211/1475; G02B 1/04; C08G 65/33396
See application file for complete search history.

(56) References Cited

U.S. PATENT DOCUMENTS 5,905,148 A * 5/1999 Krongauz ................. C07F 7/21
544/71
6,479,604 B1 * 11/2002 Kim ......................... C08F 20/30
549/462

(Continued)

FOREIGN PATENT DOCUMENTS

CN 107922605 A 4/2018
EP 3 643 735 A1 4/2020
(Continued)

OTHER PUBLICATIONS

Youhei Inoue, Paul Kuad, Yasushi Okumura, Yoshinori Takashima, Hiroyasu Yamaguchi, and Akira Harada, Thermal and Photochemical Switching of Conformation of Poly(ethylene glycol)-Substituted Cyclodextrin with an Azobenzene Group at the Chain End, J. Am. Chem. Soc. 2007, 129, 6396-6397. (Year: 2007).*

(Continued)

*Primary Examiner* — Bijan Ahvazi
(74) *Attorney, Agent, or Firm* — Birch, Stewart, Kolasch & Birch, LLP

(57) ABSTRACT

The present invention relates to a photochromic compound including a polyvalent residue on which at least one group having a photochromic moiety is substituted, and at least one long-chain group not containing a photochromic moiety and having a molecular weight of 300 or more is further substituted; and a curable composition containing the same. In (Continued)

accordance with the present invention, it is possible to provide a photochromic compound which has high solubility in a polymerizable compound serving as a matrix while retaining high photochromic characteristics and is hardly affected by the matrix; and a curable composition containing the same.

9 Claims, 1 Drawing Sheet

(56) References Cited

U.S. PATENT DOCUMENTS

| | | |
|---|---|---|
| 2004/0220292 A1 | 11/2004 | Momoda et al. |
| 2010/0230650 A1 | 9/2010 | Nagoh et al. |
| 2011/0147681 A1 | 6/2011 | Evans et al. |
| 2013/0015416 A1 | 1/2013 | Takenaka et al. |
| 2014/0107314 A1 | 4/2014 | Kawato et al. |
| 2014/0340727 A1 | 11/2014 | Mori et al. |
| 2016/0222285 A1 | 8/2016 | Shimizu et al. |
| 2018/0244931 A1 | 8/2018 | Mori et al. |
| 2018/0251657 A1 | 9/2018 | Yamamoto et al. |
| 2018/0312643 A1 | 11/2018 | Shimizu et al. |
| 2019/0161585 A1 | 5/2019 | Izumi et al. |
| 2020/0071467 A1 | 3/2020 | Shimizu et al. |
| 2020/0172681 A1 | 6/2020 | Takenaka et al. |
| 2020/0190106 A1 | 6/2020 | Miyazaki et al. |
| 2021/0032532 A1 | 2/2021 | Miyazaki et al. |

FOREIGN PATENT DOCUMENTS

| | | | |
|---|---|---|---|
| EP | 3 653 615 A1 | 5/2020 | |
| EP | 3 783 084 A1 | 2/2021 | |
| JP | 2008-273848 A | 11/2008 | |
| JP | 2016-194026 A | 11/2016 | |
| WO | WO 00/15630 A1 | 3/2000 | |
| WO | WO 03/011967 A1 | 2/2003 | |
| WO | WO 2004/041961 A1 | 5/2004 | |
| WO | WO 2009/075388 A1 | 6/2009 | |
| WO | WO 2009/146509 A1 | 12/2009 | |
| WO | WO 2011/125956 A1 | 10/2011 | |
| WO | WO 2012/149599 A1 | 11/2012 | |
| WO | WO 2012/162725 A1 | 12/2012 | |
| WO | WO 2012/176439 A1 | 12/2012 | |
| WO | WO 2013/078086 A1 | 5/2013 | |
| WO | WO 2013/099640 A1 | 7/2013 | |
| WO | WO 2013/101940 A1 | 7/2013 | |
| WO | WO 2015/068798 A1 | 5/2015 | |
| WO | WO 2017/038865 A1 | 3/2017 | |
| WO | WO 2017/038957 A1 | 3/2017 | |
| WO | WO 2017/039019 A1 | 3/2017 | |
| WO | WO-2017038957 A1 * | 3/2017 | ........... C07D 311/78 |
| WO | WO-2017039019 A1 * | 3/2017 | ......... C08B 37/0015 |
| WO | WO 2018/030257 A1 | 2/2018 | |
| WO | WO-2018030257 A1 * | 2/2018 | ............ C08F 222/10 |
| WO | WO 2018/235771 A1 | 12/2018 | |

OTHER PUBLICATIONS

L. V. Natarajan, t T. J. Bunning, and S. Y. Kim, Photochromic Liquid Crystalline Cyclic Siloxanes Containing Spiropyran Groups, Macromolecules 1994, 27, 7248-7253. (Year: 1994).*

Extended European Search Report for European Application No. 19837571.9, dated Mar. 21, 2022.

Hamada et al., "Photochromic molecular recognition of γ-cyclodextrin bearing a spiro[2H-benzopyran-2,2'-indoline] moiety," Macromolecular Rapid Communications, vol. 15, No. 6, Jun. 1994, XP000464087, pp. 531-536 (6 pages total).

Malic et al., "The Use of Poly(Alkylene Oxide)s to Achieve Fast and Controlled Photochromic Switching in Rigid Matrices," Journal of Polymer Science Part A: Polymer Chemistry, vol. 50, No. 7, Jan. 24, 2012, XP055227241, pp. 1434-1444 (11 pages total).

Chinese Office Action and Search Report for Chinese Application No. 201980047737.X dated Nov. 2, 2022.

International Search Report issued in PCT/JP2019/028358 (PCT/ISA/210), dated Oct. 8, 2019.

Indian Office Action for corresponding Indian Application No. 202147001392, dated Feb. 17, 2022, with English translation.

* cited by examiner

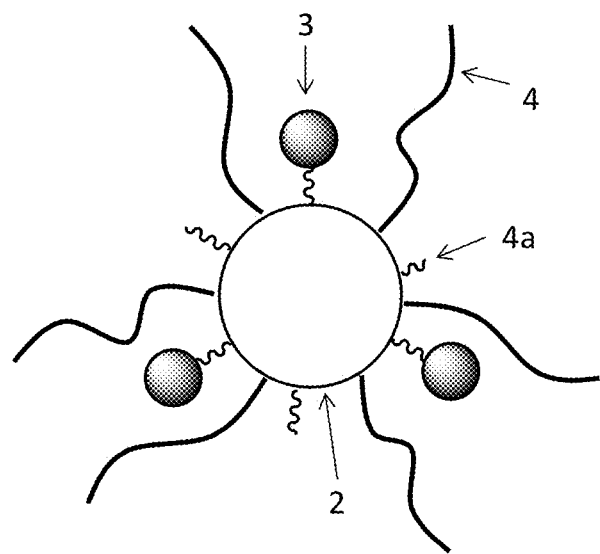

PHOTOCHROMIC COMPOUND AND CURABLE COMPOSITION CONTAINING SAID PHOTOCHROMIC COMPOUND

TECHNICAL FIELD

The present invention relates to a novel photochromic compound and a curable composition containing the photochromic compound.

BACKGROUND ART

Photochromic compounds typified by naphthopyran compounds, fulgide compounds, and spirooxazine compounds have a characteristic feature (photochromic properties) that they change their colors swiftly upon exposure to light including ultraviolet light, such as sunlight and light from a mercury lamp, and return to their original colors when they are put in the dark by stopping their exposure to light and are used for various purposes, especially optical materials, making use of this characteristic feature.

For example, photochromic spectacle lenses which are provided with photochromic properties by using a photochromic compound function as sunglasses which are quickly colored outdoors where they are irradiated with light including ultraviolet light, such as sunlight, and as ordinary transparent eyeglasses which are faded indoors where there is no irradiation, and demand for the photochromic spectacle lenses is growing nowadays.

To impart photochromic properties to an optical material, a photochromic compound is generally used in combination with a plastic material. Specifically, the following measures are known.
  (a) A method in which a photochromic compound is dissolved in a polymerizable monomer, and the resulting solution is polymerized to directly mold an optical material, such as a lens. This method is called "kneading method".
  (b) A method in which a resin layer containing a photochromic compound dispersed therein is formed on the surface of a plastic molded article, such as a lens, by coating or cast polymerization. This method is called "lamination method".
  (c) A method in which two optical sheets are bonded together by means of an adhesive layer formed from an adhesive resin containing a photochromic compound dispersed therein. This method is called "binder method".

For optical materials, such as optical articles, having photochromic properties imparted thereto, the following properties are further required.
  (I) The degree of coloration at a visible light range before ultraviolet light is applied (initial coloration) be low.
  (II) The degree of coloration upon exposure to ultraviolet light (color optical density) be high.
  (III) The speed from the stoppage of the application of ultraviolet light to the time when the material returns to its original state (fading speed) be high.
  (IV) The repeat durability of a reversible function between color development and fading be high.
  (V) Storage stability be high.
  (VI) The material should be easily molded into various shapes.
  (VII) Photochromic properties be imparted without the reduction of mechanical strength.

Therefore, for the manufacture of optical materials having photochromic properties by the aforementioned measures (a), (b) and (c), various proposals have been made to satisfy the aforementioned requirements.

The aforementioned kneading method has an advantage that photochromic plastic lenses can be mass-produced at a low cost by using glass molds. Most of photochromic plastic lenses are now manufactured by this method (see PTLs 1 and 2). As strength is required for a lens substrate in the conventional kneading method, it is necessary to enhance the mechanical strength of a matrix resin containing a photochromic compound dispersed therein. Therefore, it is difficult to develop excellent photochromic properties. That is, since the degree of freedom of the molecule of the photochromic compound existent in the matrix resin becomes low, a photochromic reversible reaction is occasionally impaired.

As for this kneading method, PTL 1 discloses a technique for adding a photochromic compound to a monomer composition containing an isocyanate monomer and a thiol monomer. In addition, PTL 2 discloses a photochromic curable composition containing a specific (meth)acrylic polymerizable monomer and a photochromic compound.

However, though photochromic lenses molded by polymerizing and curing these compositions have high mechanical strength, there is still room for the improvement of photochromic properties, especially fading speed.

Meanwhile, in the lamination method and the binder method, photochromic properties are developed with a thin layer formed on the surface of a substrate as compared with the aforementioned kneading method (see, for example, PTL 3, PTL 4, and PTL 5). Therefore, to develop the same color optical density as that of the kneading method, a photochromic compound must be dissolved at a high concentration. In this case, according to the type of a photochromic compound, there occurs a problem, such as unsatisfactory solubility and precipitation during storage. In addition, since the layer which develops photochromic properties is thin, the photochromic compound was occasionally inferior in durability.

PTL 3 discloses that a photochromic curable composition is applied to a plastic lens by spin coating or the like and optically cured to form a photochromic coating layer (this lamination method is also called "coating method"). In addition, PTL 4 discloses a method in which a gap is secured between a plastic lens and a glass mold by using a member, such as an elastomer gasket, a pressure sensitive adhesive tape, and a spacer, and a photochromic curable composition is poured into this gap and polymerized and cured to form a photochromic layer (hereinafter also referred to as "two-stage polymerization method"). Furthermore, PTL 5 discloses that a laminate sheet is manufactured by bonding together transparent carbonate sheets by a polyurethane resin adhesive layer containing a photochromic compound (binder method).

However, in all of PTLs 3 to 5, photochromic properties need to be revealed with a thin layer having a photochromic compound blended therein. Therefore, in the case where a photochromic compound having low solubility is used, a color optical density tends to become low, and furthermore, there was room for the improvement from the standpoint of durability of the photochromic compound.

In addition, for the aforementioned improvements, a photochromic curable composition containing a novel compound is now under study (see PTL 6). PTL 6 discloses a photochromic curable composition containing a polyrotaxane compound. This polyrotaxane compound is a compound having a composite molecular structure composed of an axial molecule and a plurality of cyclic molecules clathrating the axial molecule. In PTL 6, a cured body having excellent mechanical characteristics, moldability, color optical density, and fading speed is obtained by blending a photochromic compound with the polyrotaxane compound. In PTL 6, as mentioned above, an excellent photochromic curable composition and an excellent cured body are obtained by blending a polyrotaxane compound.

However, in recent years, it is required to reveal more excellent photochromic properties regarding the color optical density, the fading speed, and so on. Basically, the color optical density and the fading speed have a trade-off relationship, and therefore, it is not easy to make the both of them compatible with each other. That is, these frequently depend upon a combination of polymerizable compounds constituting a matrix, and in the conventional technology, there was a limit by all means.

CITATION LIST

Patent Literature

PTL 1: WO 2012/176439 A
PTL 2: WO 2009/075388 A
PTL 3: WO 2011/125956 A
PTL 4: WO 2003/011967 A
PTL 5: WO 2013/099640 A
PTL 6: WO 2015/068798 A
PTL 7: WO 2004/041961 A
PTL 8: WO 2000/015630 A
PTL 9: WO 2009/146509 A
PTL 10: WO 2012/149599 A
PTL 11: WO 2012/162725 A
PTL 12: WO 2013/078086 A

SUMMARY OF INVENTION

Technical Problem

In addition to such a combination of polymerizable compounds constituting a matrix, with respect to adjustment of a structure of the photochromic compound itself, various studies are made. For example, in order to significantly increase the fading speed, a photochromic compound capable of being nano-encapsulated is proposed. Specifically, photochromic compounds having a polyalkylene oxide oligomer chain group or a polysiloxane oligomer chain group are proposed (see PTLs 7 and 8). In addition, besides, photochromic compounds having at least two photochromic moieties are disclosed, too (see PTLs 9 to 12). According to these methods, it is possible to achieve nano-encapsulation, and the dye concentration can be increased.

However, according to investigations made by the present inventors, even in these conventional compounds, in order to cope with recently required high-level photochromic characteristics, more improvements were needed. In particular, it was difficult to minimize the dependence upon the matrix and to more increase the fading speed.

In the light of the above, even in the conventional method of adjusting the structure of the photochromic compound itself, there was room for the improvement from the standpoint that solubility in the polymerizable compound forming the matrix is problematic, and the photochromic characteristics are not sufficient.

In consequence, an object of the present invention is to provide a photochromic compound which has high solubility in a polymerizable compound serving as a matrix while retaining high photochromic characteristics and is hardly affected by the matrix; and a curable composition containing the same.

Solution to Problem

In order to solve the aforementioned problem, the present inventors made extensive and intensive investigations. Then, they synthesized photochromic compounds having various structures. Then, they thought that photochromic compounds having a group having a photochromic moiety and a long-chain substituent not containing the foregoing photochromic moiety at the same time may possibly improve compatibility with a polymerizable compound that forms a matrix, by the long-chain substituent, and a free space where the photochromic moiety is able to undergo a reversible reaction can be formed in the matrix.

Then, for the purpose of overcoming the aforementioned problem, the present inventors made investigations. As a result, it has been found that by disposing a long-chain group not bonding to a photochromic moiety in the vicinity of the photochromic moiety, photochromic properties can be exhibited to the maximum extent, thereby leading to accomplishment of the present invention.

Specifically, a first aspect of the present invention is concerned with a photochromic compound including
a polyvalent residue on which
at least one group having a photochromic moiety is substituted, and
at least one long-chain group not containing a photochromic moiety and having a molecular weight of 300 or more is further substituted. The molecular weight of the long-chain group is a number average molecular weight.

A second aspect of the present invention is concerned with a photochromic curable composition containing the photochromic compound according to the first aspect of the present invention and a polymerizable compound.

A third aspect of the present invention is concerned with a photochromic cured body obtained by curing the photochromic curable composition according to the second aspect of the present invention.

Advantageous Effects of Invention

The photochromic compound of the present invention exhibits excellent photochromic characteristics. Furthermore, even in the case of containing the foregoing photochromic compound and polymerizable compound, a cured body revealing excellent photochromic properties in color optical density and fading speed can be obtained.

BRIEF DESCRIPTION OF DRAWING

FIG. 1 is a diagrammatic view showing a molecular structure of the photochromic compound of the present invention.

DESCRIPTION OF EMBODIMENTS

The present invention is concerned with a photochromic compound including
a polyvalent residue on which
at least one group having a photochromic moiety is substituted, and at least one long-chain group not containing a photochromic moiety and having a molecular weight of 300 or more is further substituted.

Details thereof are hereunder described.

(Polyvalent Residue)

In the present invention, the polyvalent residue must be one on which at least one group having a photochromic moiety is substituted, and at least one long-chain group not containing a photochromic moiety and having a molecular weight of 300 or more is further substituted. Accordingly, the polyvalent residue must be a divalent or higher valent group.

The polyvalent residue may be any of an organic residue and an inorganic residue. That is, the polyvalent residue may be an organic residue or may be an inorganic residue so long as it is at least a divalent or higher valent group having a long-chain group (provided that it does not have a photochromic moiety) and a group having a photochromic moiety. Such a polyvalent residue may be formed of a compound having a site into which plural substituents can be introduced (for example, a compound having plural reactive groups, such as a hydroxy group, or a compound having plural sites to which a substituent can be added to a benzene ring, such as a phenyl group; hereinafter occasionally referred to simply as "compound or substance forming a polyvalent residue").

It is preferred that the compound or substance forming a polyvalent residue has a size to some extent. That is, taking into consideration productivity of the photochromic compound itself, when the long-chain group is too close to the position into which the group having a photochromic moiety is introduced, steric hindrance is present, so that the photochromic compound cannot be produced with productivity. Accordingly, as for the compound or substance forming a polyvalent residue, which is used in the present invention, it is preferred to use a compound capable of forming an organic residue and/or a substance forming an inorganic residue as described below.

<Compound Forming Organic Residue>

First, the organic residue is described. Examples of the organic residue include a cyclic molecular compound into which a substituent can be introduced. So long as the compound is a cyclic molecule, it has a size to some extent, and therefore, it is easy to introduce the group having a photochromic moiety and the long-chain group. Examples of such a cyclic molecule include a cyclodextrin, a crown ether, a benzo-crown, a dibenzo-crown, and a dicyclohexano-crown. Of these, a cyclodextrin having an appropriate size is especially preferred.

The cyclodextrin is a cyclic oligosaccharide in which a glucose unit is α-1,4-bonded and has three hydroxy groups (OH groups) per glucose unit. Examples thereof include an α-body (glucose unit number: 6, total hydroxy group number: 18), a ß-body (glucose unit number: 7, total hydroxy group number: 21), and a γ-body (glucose unit number: 8, total hydroxy group number: 24). In the case of a cyclodextrin, the number of hydroxy groups that are a reactive group (total hydroxy group number) coincides with a whole valence of the polyvalent residue. Above all, in the present invention, α-cyclodextrin (α-body) or ß-cyclodextrin (ß-body) is preferred, and α-cyclodextrin is most preferred.

Besides, examples of the organic residue include the following groups. Examples thereof include an oligocarboxylic acid, such as cyclophane, calixarene, oligoresolcinol, cucurbituril, tribenzocyclononene, and a citric acid, a polycarboxylic acid, such as polyacrylic acid, an oligoamine, such as tris-2-aminoethylamine, a polyamine, such as spermine, a polyol, such as pentaerythritol, a nucleic acid, a (cyclic) oligopeptide, an acidic or basic protein, a disaccharide or more oligosaccharide, a cycloamylose, nanocellulose, an oligo or polyphenol, such as lignin, porphyrin, phthalocyanine, and a metal complex thereof, and a nanocarbon, such as fullerene, carbon nanotube, graphene, and graphene oxide.

<Substance Forming Inorganic Residue>

In the present invention, an inorganic residue can also be used. Examples thereof include silsesquioxane, perovskite, an oligophosphoric acid or polyphosphoric acid, such as diphosphoric acid and triphosphoric acid, a metal (oxide) nanoparticle, such as gold, titanium oxide, and zinc oxide, and a polyoxometalate, such as phosphomolybdic acid and phosphotungstic acid.

<Preferred Residue (Compound (Substance) Capable of Forming Preferred Residue)>

In the present invention, a cyclodextrin, an oligopeptide, an oligophosphoric acid, a polyphosphoric acid, silsesquioxane, or a metal (oxide) nanoparticle is exemplified as the compound (substance) capable of forming a preferred residue.

In the present invention, in order to not only retain the photochromic characteristics to a high degree but also improve the solubility in a polymerizable compound, it is preferred to use a polyvalent residue (compound (substance)) capable of satisfying the requirement that a total number of the group having a photochromic moiety and the number of the long-chain group having a molecular weight of 300 or more per molecule of the photochromic compound is 2 to 30.

So long as the photochromic compound of the present invention has each one of the group having a photochromic moiety and the long-chain group having a molecular weight of 300 or more, other group than the foregoing groups may be substituted on the compound (substance) forming a polyvalent residue. The other group is a group not having a photochromic moiety and having a molecular weight of less than 300. That is, the polyvalent residue is able to have the group having a photochromic moiety, the long-chain group having a molecular weight of 300 or more (hereinafter occasionally referred to simply as "long-chain group"), the group having a molecular weight of less than 300 (hereinafter occasionally referred to simply as "short-chain group"), and a reaction site remaining as it is without being substituted. The whole valence of the polyvalent residue coincides with a total number of the number of the group having a photochromic moiety, the number of the long-chain group, the number of the short-chain group, and the number of the reaction site remaining as it is without being substituted. Although a lower limit of the molecular weight of the short-chain group is not particularly restricted, it is 10.

Accordingly, as for the polyvalent residue, though the valence of the polyvalent group is not particularly limited so long as it is divalent or higher valent, a trivalent or higher valent group is preferred, a tetravalent or higher valent group is more preferred, and a hexavalent or higher valent group is still more preferred.

On the other hand, an upper limit of the valence is not particularly restricted. In the present invention, it is preferred that the total number of the group having a photochromic moiety and the number of the long-chain group per molecule of the photochromic compound is able to satisfy a range of 2 to 30, and therefore, the upper limit of the valence may be 30 or more, and it is preferred that 40 is the upper limit of the valence. Above all, in order to enhance the productivity of the photochromic compound (to suppress the side-reaction and to enhance the production efficiency), it is preferred that the upper limit of the valence of the polyvalent residue is 20. As a matter of course, in the case where the upper limit of the valence of the polyvalent residue is 20, the total number of the group having a photochromic moiety and the number of the long-chain group is 2 or more and 20 or less.

Such a compound forming a polyvalent residue is preferably α-cyclodextrin.

<Group Having Photochromic Moiety>

As illustrated in FIG. 1, in the photochromic compound of the present invention, which is expressed collectively as "1", the group containing a photochromic moiety "3" is introduced into the polyvalent residue "2". In addition, the long-chain group having a molecular weight (number average molecule weight) of 300 or more is further introduced into the polyvalent residue. In FIG. 1, this long-chain group is expressed as "4".

In the present invention, though the group having a photochromic moiety can be directly bonded to the polyvalent residue, it is preferred that the photochromic moiety is bonded in a state that a space remains to some extent. Accordingly, a state that a side chain (hereinafter occasionally referred to as "first side chain") intervenes between the polyvalent residue and the photochromic moiety is preferred. The group of this side chain (first side chain) is expressed as "4a" in FIG. 1. While illustration is omitted, there may be a case where a reaction site ("reactive group, etc. which the polyvalent residue possesses" as mentioned later) is present.

<Side Chain Bonding Photochromic Moiety and Polyvalent Residue>

By introducing such a side chain "4a" (first side chain "4a") into the photochromic moiety an appropriate space can be surely formed between the molecules adjacent to each other. As a result, a gap tolerable for a reversible reaction of the photochromic compound molecule can be surely secured, and therefore, it may be thought that more excellent photochromic properties can be revealed.

Although the side chain is not particularly restricted, a number average molecular weight of such a side chain is preferably 45 to 10,000, more preferably 60 to 8,000, still more preferably 100 to 5,000, and especially preferably 100 to 2,000. This side chain becomes the group having a photochromic moiety so long as the photochromic moiety is introduced. The number average molecular weight of this side chain can be regulated by the amount of the compound to be used during introducing the side chain. It is to be noted that the molecular weight of the photochromic moiety is not included in the number average molecular weight of the side chain. In addition, a group not having a photochromic moiety introduced thereinto and having a number average molecular weight of 300 or more is corresponding to the long-chain group, and a group having a number average molecular weight of less than 300 is corresponding to the short-chain group.

When the side chain is too small, a function to secure a gap tolerable for a reversible reaction of the photochromic moiety becomes insufficient, whereas when the side chain is too large, it becomes difficult to place the photochromic moiety in the vicinity of the long-chain group as mentioned later, and ultimately, there is a tendency that it becomes difficult to make full use of the space secured by the long-chain group.

The aforementioned side chain can be introduced by utilizing the reactive group or reaction site which the polyvalent residue possesses (hereinafter occasionally referred to simply as "reactive group, etc. which the polyvalent residue possesses"). In the present invention, in order to sufficiently exhibit the aforementioned function of the side chain, it is preferred that 6% or more, especially 10% or more of the whole valance which the polyvalent residue possesses is substituted with the side chain. For example, in the case of using α-cyclodextrin as the compound forming a polyvalent residue, it has 18 hydroxy groups as the reaction group, and the side chain is introduced via this hydroxy group. That is, it is possible to introduce 18 side chains at maximum relative to one α-cyclodextrin. In the present invention, in order to sufficiently exhibit the aforementioned function of the side chain, it is preferred that 6% or more, especially 10% or more of the whole reaction group number (whole valence) which such a ring possesses is modified with the side chain. An upper limit of a proportion of modification with the side chain (introduction of the side chain) varies with the compound to be used, and therefore, though it is not particularly restricted, it is 90%. Incidentally, in the case where the side chain is bonded to 9 of the 18 hydroxy groups of α-cyclodextrin, its degree of modification is 50%. As a matter of course, the remainder is a hydroxy group as it is. In the case of α-cyclodextrin, an upper limit of the degree of modification is preferably 75%.

In the present invention, the aforementioned side chain (organic chain) may be linear or may be branched so long as its size falls within the aforementioned range. A side chain having an appropriate size can be introduced by reacting an appropriate compound with the compound forming a polyvalent residue (reacting with the "reactive group, etc. which the polyvalent residue possesses") while utilizing ring-opening polymerization; radical polymerization; cationic polymerization; anionic polymerization; living radical polymerization, such as atom transfer radical polymerization, RAFT polymerization, and NMP polymerization; or the like. In a terminal of the side chain formed by the polymerization or the like, the side chain can be extended while utilizing a variety of known reactions, or the photochromic moiety can be introduced as mentioned below in detail. However, the photochromic moiety may also be directly bonded to the foregoing side chain. As for the side chain formed through polymerization or the like, or the side chain extended utilizing a variety of reactions, as mentioned above, the number average molecular weight excluding the photochromic moiety is most preferably 100 to 2,000.

For example, a side chain derived from a cyclic compound, such as a cyclic ether, a cyclic siloxane, a lactone compound, a cyclic acetal, a cyclic amine, a cyclic carbonate, a cyclic imino ether, and a cyclic thiocarbonate, can be introduced through ring-opening polymerization. Of these, from the viewpoint that availability is easy, reactivity is high, and adjustment of the size (molecular weight) is easy, a cyclic ether, a cyclic siloxane, a lactone compound, or a cyclic carbonate is preferably used. Specific examples of a preferred cyclic compound are as follows.

Cyclic Ether:

Ethylene oxide, 1,2-propylene oxide, epichlorohydrin, epibromohydrin, 1,2-butylene oxide, 2,3-butylene oxide, isobutylene oxide, oxetane, 3-methyloxetane, 3,3-dimethyloxetane, tetrahydrofuran, 2-methyl tetrahydrofuran, and 3-methyl tetrahydrofuran Cyclic Siloxane:

Hexamethyl cyclotrisiloxane and octamethyl cyclotetrasiloxane

Lactone Compound:

4-Membered ring lactones, such as ß-propiolactone, ß-methyl propiolactone, and L-serine-ß-lactone 5-Membered ring lactones, such as γ-butyrolactone, γ-hexanolactone, γ-heptanolactone, γ-octanolactone, γ-decanolactone, γ-dodecanolactone, α-hexyl-γ-butyrolactone, α-heptyl-γ-butyrolactone, α-hydroxy-γ-butyrolactone, γ-methyl-γ-decanolactone, α-methylene-γ-butyrolactone, α,α-dimethyl-γ-butyrolactone, D-erythronolactone, α-methyl-γ-butyrolactone, γ-nonanolactone, DL-pantolactone, γ-Phenyl-γ-butyrolactone, γ-undecanolactone, γ-valerolactone, 2,2-pentamethylene-1,3-dioxolan-4-one, α-bromo-γ-butyrolactone, γ-crotonolactone, α-methylene-γ-butyrolactone, α-methacryloyloxy-γ-butyrolactone, and β-methacryloyloxy-γ-butyrolactone 6-Membered ring lactones, such as δ-valerolactone, δ-hexanolactone, δ-octanolactone, δ-nonanolactone, δ-decanolactone, δ-undecanolactone, δ-dodecanolactone, δ-tridecanolactone, δ-tetradecanolactone, DL-mevalonolactone, 4-hydroxy-1-cyclohexane carboxylic acid δ-lactone, monomethyl-δ-valerolactone, monoethyl-δ-valerolactone, monohexyl-δ-valerolactone, 1,4-dioxan-2-one, and 1,5-dioxepan-2-one 7-Membered ring lactones, such as ε-caprolactone, monomethyl-ε-caprolactone, monoethyl-ε-caprolactone, monohexyl-ε-caprolactone, dimethyl-ε-caprolactone, di-n-propyl-ε-caprolactone, di-n-hexyl-ε-caprolactone, trimethyl-ε-caprolactone, triethyl-ε-caprolactone, tri-n-ε-caprolactone, ε-caprolactone, 5-nonyl-oxepan-2-one, 4,4,6-trimethyl-oxepan-2-one, 4,6,6-trimethyl-oxepan-2-one, and 5-hydroxymethyl-oxepan-2-one 8-Membered ring lactones, such as ξ-enantholactone Other lactones, such as lactone, lactide, dilactide, tetramethyl glycoside, 1,5-dioxepan-2-one, and t-butyl caprolactone Cyclic Carbonate:

Ethylene carbonate, propylene carbonate, 1,2-butylene carbonate, glycerol 1,2-carbonate, 4-(methoxymethyl)-1,3-dioxolan-2-one, (chloromethyl)ethylene carbonate, vinylene carbonate, 4,5-dimethyl-1,3-dioxol-2-one, 4-chloromethyl-5-methyl-1,3-dioxol-2-one, 4-vinyl-1,3-dioxolan-2-one, 4,5-diphenyl-1,3-dioxolan-2-one, 4,4-dimethyl-5-methylene-1,3-dioxolan-2-one, 1,3-dioxan-2-one, 5-methyl-5-propyl-1,3-dioxolan-2-one, and 5,5-diethyl-1,3-dioxolan-2-one The aforementioned cyclic compounds can be used alone or can be used in combination of two or more thereof.

In the present invention, lactone compounds and cyclic carbonates are preferably used, and of these, lactone compounds, such as ε-caprolactone, α-acetyl-γ-butyrolactone, α-methyl-γ-butyrolactone, γ-valerolactone, and γ-butyrolactone are especially preferred, and ε-caprolactone is most preferred.

In the case of reacting the cyclic compound through ring-opening polymerization to introduce the side chain, the reactive group, etc. which the polyvalent residue possesses (for example, a hydroxy group of the cyclodextrin) is poor in reactivity, so that in particular, it is occasionally difficult to directly react a large molecule due to steric hindrance or the like. In such case, there can be adopted a measure in which, in order to react a caprolactone etc., a low-molecular weight compound, such as propylene oxide, is first reacted with a functional group to perform hydroxypropylation, thereby introducing the functional group (hydroxy group) rich in reactivity and then, the side chain is introduced through ring-opening polymerization using the aforementioned cyclic compound. The side chain formed by the ring-opening polymerization of the low-molecular weight compound, such as propylene oxide, and the cyclic compound is hereinafter occasionally referred to as "first side chain" (as mentioned above, "4a" in FIG. 1 is corresponding to this first side chain).

In the photochromic compound of the present invention, the group containing a photochromic moiety is bonded to the polyvalent residue (preferably, the photochromic moiety is bonded via the side chain). On this polyvalent residue, the long-chain group having a molecular weight (number average molecular weight) of 300 or more is substituted without exception. According to this, the foregoing long-chain group can be always disposed in the vicinity of the photochromic moiety, and therefore, a free space tolerable for a reversible reaction of the photochromic moiety can be secured. As a result, it may be considered that even in when combined with the polymerizable compound, the fading speed can be made fast while retaining the high color optical density.

The photochromic moiety can be bonded to the polyvalent residue by utilizing the aforementioned side chain and optionally, further combining a linking group L. That is, by reacting the first side chain to the photochromic moiety having the linking group L to bond the first side chain to the linking group L, the chain (group) containing a photochromic moiety can be introduced into the aforementioned compound forming a polyvalent residue. In this case, the foregoing "chain" contains a portion resulting from a reaction of "first side chain and the linking group L" to become one containing the portion of the first side chain and the linking group L. As mentioned above, the foregoing "chain" is corresponding to the aforementioned side chain. However, as mentioned above, the photochromic moiety may be directly bonded to the first side chain, and in this case, the first side chain may be considered as the foregoing "chain", whereby the foregoing "chain" becomes a side chain (the first side chain is the side chain).

As the photochromic moiety, those which are known can be used, and these can be used alone or can be used in combination of two or more thereof.

Typical examples of the photochromic moiety include naphthopyran, spirooxazine, spiropyran, fulgide, fulgimide, and diarylethene. Above all, in the case where the photochromic moiety is naphthopyran, spirooxazine, or spiropyran, in which a part of the molecule is cleaved due to ultraviolet light to cause color development, and the cleaved site is recombined to cause color fading, and in which the presence of a free space (degree of freedom of molecule) not preventing the movement of the molecule on the occasion of occurrence of cleavage and recombination is important, an excellent effect is exhibited. In particular, of these, from the standpoint that excellent photochromic properties regarding the color optical density and the fading speed can be revealed, an indenonaphthopyran is preferred, and an indeno [2,1-f]naphtho[1,2-b]pyran is especially preferred.

The indeno[2,1-f]naphtho[1,2-b]pyran which is exemplified as the especially preferred photochromic moiety is represented by the following formula (4):

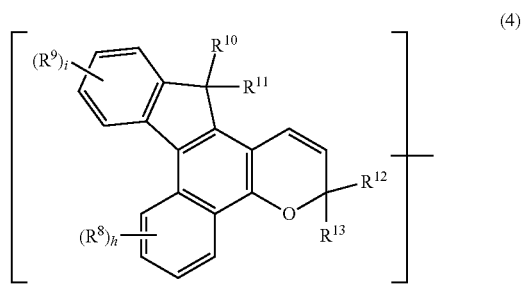

wherein,
R[8] and R[9] are each independently a group directly bonded to L as mentioned later, a hydroxy group, an alkyl group, a haloalkyl group, a cycloalkyl group which may have a substituent, an alkoxy group, an amino group (group including a primary or secondary amine), a heterocyclic group having a ring member nitrogen atom and bonded to a carbon atom by the nitrogen atom bonded thereto (provided that it may have a substituent), a cyano group, a nitro group, a formyl group, a hydroxycarbonyl group, an alkylcarbonyl group, an alkoxycarbonyl group, a halogen atom, an aralkyl group which may have a substituent, an aralkoxy group which may have a substituent, an aryloxy group which may have a substituent, an aryl group which may have a substituent, an alkylthio group, a cycloalkylthio group, or an arylthio group which may have a substituent, and two adjacent R[8]'s and two adjacent R[9]'s may independently form an aliphatic ring (which may have a substituent) which may contain an oxygen atom, a nitrogen atom, or a sulfur atom;

R[10] and R[11] are each independently a group directly bonded to L as mentioned later, a hydrogen atom, a hydroxy group, an alkyl group, a haloalkyl group, a cycloalkyl group, an alkoxy group, an alkoxyalkyl group, a formyl group, a hydroxycarbonyl group, an alkylcarbonyl group, an alkoxycarbonyl group, a halogen atom, an aralkyl group which may have a substituent, an aralkoxy group which may have a substituent, an aryloxy group which may have a substituent, or an aryl group which may have a substituent, and R[10] and R[11] may form together an aliphatic ring having 3 to 20 ring member carbon atoms, a condensed polycyclic ring obtained by condensing an aromatic ring or an aromatic hetero ring to the aliphatic ring, a heterocyclic ring having 3 to 20 ring member atoms, or a condensed polycyclic ring obtained by condensing an aromatic ring or an aromatic heterocyclic ring to the heterocyclic ring together with the carbon atom at the 13-position bonded thereto, with the proviso that these rings may have a substituent;

R[12] and R[13] are each independently an aryl group which may have a substituent or a heteroaryl group which may have a substituent;

h is an integer of 0 to 4;
i is an integer of 0 to 4;
when h is 2 to 4, then plural R[8]'s may be the same as or different from each other; and
when i is 2 to 4, then plurality R[9]'s may be the same as or different from each other,
with the proviso that at least one substituent on the aryl group or the heteroaryl group represented by R[8], R[9], R[10], R[11], and R[12], or at least one substituent on the aryl group or the heteroaryl group represented by R[13] is a substituent L as mentioned later.

The groups represented by R[8], R[9], R[10], R[11], R[12], and R[13], or the substituents which may be possessed by the ring groups formed by these groups are introduced to control mainly developed color tone and do not impair the effect of the present invention. Therefore, though they are not particularly restricted, the groups represented by R[8] and R[9] are preferred.

In the above, the alkyl group preferably has 1 to 6 carbon atoms; the haloalkyl group preferably has 1 to 6 carbon atoms; the cycloalkyl group preferably has 3 to 8 carbon atoms; the alkoxy group has 1 to 6 carbon atoms; the alkylcarbonyl group preferably has 2 to 7 carbon atoms; the alkoxycarbonyl group preferably has 2 to 7 carbon atoms; the aralkyl group preferably has 7 to 11 carbon atoms; the aralkoxy group preferably has 7 to 11 carbon atoms; the aryloxy group preferably has 6 to 12 carbon atoms; the aryl group preferably has 6 to 12 carbon atoms; the alkylthio group preferably has 1 to 6 carbon atoms; the cycloalkylthio group preferably has 3 to 8 carbon atoms; and the arylthio group preferably has 6 to 12 carbon atoms.

As the indeno[2,1-f]naphtho[1,2-b]pyran forming the photochromic moiety, compounds described in WO 1996/014596 A, WO 2001/019813 A, WO 2001/060811 A, WO 2005/028465 A, WO 2006/110221 A, WO 2007/073462 A, WO 2007/140071 A, WO 2008/054942 A, WO 2010/065393 A, WO 2011/10744 A, WO 2011/016582 A, WO 2011/025056 A, WO 2011/034202 A, WO 2011/078030 A, WO 2012/102409 A, WO 2012/102410 A, and WO 2012/121414 A can be used without any restrictions.

The group having a photochromic moiety (side chain containing a photochromic moiety) is preferably one represented by the following formula (1) or (1'):

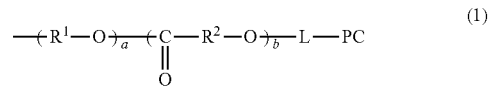

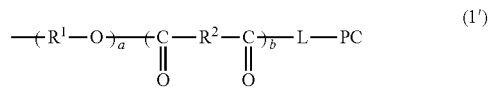

wherein,
PC is a photochromic group (photochromic moiety);
R[1] is a linear or branched alkylene group having 2 to 8 carbon atoms;
R[2] is a linear or branched alkylene group having 2 to 8 carbon atoms, a linear or branched alkylene group having an acetyl group branch and having 3 to 8 carbon atoms, or a linear or branched alkylene group having an ether bond and having 3 to 8 carbon atoms;
L is represented by the following formula (2):

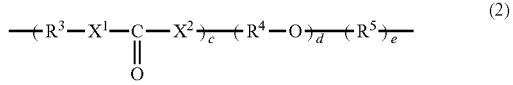

wherein,
R[3] is a single bond, a linear or branched alkylene group having 1 to 20 carbon atoms, a cycloalkylene group having 3 to 12 carbon atoms, or an aromatic group having 6 to 12 carbon atoms;
R[4] is a linear or branched alkylene group having 1 to 20 carbon atoms, a cycloalkylene group having 3 to 12 carbon atoms, an aromatic group having 6 to 12 carbon atoms, or a dialkylsilyl group having a linear or branched alkyl group having 1 to 20 carbon atoms;
R[5] is a linear or branched alkylene group having 1 to 20 carbon atoms, a cycloalkylene group having 3 to 12 carbon atoms, or an aromatic group having 6 to 12 carbon atoms;
$X^1$ and $X^2$ are each independently a single bond, O, or NH;
c is an integer of 0 to 50, d is an integer of 0 to 50, and e is an integer of 0 or 1;

when c is 2 or more, then a "c" number of divalent groups may be the same as or different from each other;

when d is 2 or more, then a "d" number of divalent groups may be the same as or different from each other;

a is an integer of 1 to 50, and b is an integer of 0 to 50;

when a is 2 or more, then an "a" number of divalent groups may be the same as or different from each other; and when b is 2 or more, then a "b" number of divalent groups may be the same as or different from each other.

Of these, especially preferred groups are exemplified below.

$R^1$ is preferably an ethylene group, a propylene group, an isopropylene group, or a butylene group, and especially preferably an isopropylene group, a is preferably 1 to 10, and especially preferably 1.

$R^2$ is especially preferably a butylene group, a pentylene group, or a hexylene group, b is preferably 1 to 10, and especially preferably 2 to 8.

As for L represented by the formula (2), $R^3$ is preferably a single bond (in this case, $X^1$ is directly bonded to the oxygen atom of the unit "b") or an ethylene group, a propylene group, or a cyclohexylene group. Furthermore, $R^3$ is especially preferably a single bond or an ethylene group.

$X^1$ and $X^2$ are each more preferably a single bond (in this case, the carbonyl group is directly bonded to $R^3$ and $R^4$) or O (oxygen atom).

$R^4$ is preferably an ethylene group, a propylene group, a butylene group, or a dimethylsilyl group, and especially preferably an ethylene group or a dimethylsilyl group.

c is preferably 2; d is preferably 1 to 10, and especially preferably 1 to 5; and e is preferably 0.

Of these, especially preferred groups of L are exemplified below.

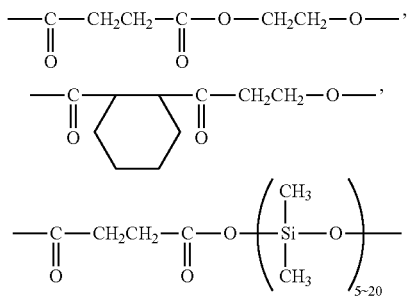

As a matter of course, the portion from which PC is removed in the formula (1) is corresponding to the "chain". An average molecular weight of the foregoing "chain" (side chain) from which PC is removed is preferably 45 to 10,000, more preferably 60 to 8,000, still more preferably 100 to 5,000, and especially preferably 100 to 2,000.

(Re: Long-Chain Group which the Polyvalent Residue Possesses)

In the present invention, the residue is a group in which at least one long-chain group not containing a photochromic moiety and having a molecular weight of 300 or more is substituted. That is, the polyvalent residue must be one in which a long-chain group having a molecular weight of 300 or more is bonded. According to this, a cured body having excellent photochromic properties can be obtained by polymerizing and curing a combination with a polymerizable compound.

Similar to the chain (group) containing a photochromic moiety as mentioned above, such a long-chain group can be bonded to the polyvalent residues by utilizing the aforementioned side chain (first side chain) and optionally, further combining the linking group L.

In the photochromic compound of the present invention, the terminal of the first side chain may be a polymerizable group. In this case, the group in which the number average molecular weight of the first side chain is 300 or more and which contains a polymerizable group in the terminal thereof is corresponding to the long-chain group. Meanwhile, the group in which the number average molecular weight of the first side chain is less than 300 and which contains a polymerizable group in the terminal thereof is corresponding to the short-chain group.

In the case of reacting the first side chain with the polymerizable group-containing compound having the linking group L to bond the first side chain to the linking group L, thereby introducing the polymerizable group into the cyclic molecule, the "long chain" contains a portion resulting from a reaction of "the first side chain and the linking group L" to become one containing the portion of the first side chain and the linking group L. As mentioned above, the "long chain" is corresponding to the aforementioned side chain. The polymerizable group portion does not largely affect the number average molecular weight of the long chain group, and therefore, the number average molecular weight of the long chain group can be restricted by one in a state of containing the polymerizable group. Specifically, the number average molecular weight of the long chain group is preferably 300 to 10,000, more preferably 300 to 8,000, still more preferably 400 to 5,000, and especially preferably 500 to 2,000. As a matter of course, the case where the number average molecular weight of the first side chain containing a polymerizable group, or "the first side chain and the linking group L" containing a polymerizable group (number average molecular weight containing a polymerizable group) is less than 300 is corresponding to the short-chain group.

In the present invention, the long-chain group is preferably one represented by the following formula (3) or (3'):

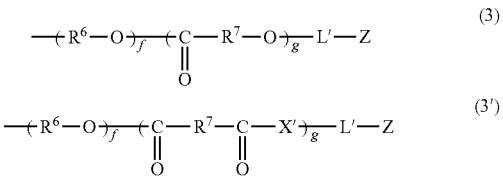

wherein,

Z is an alkyl group having 1 to 10 carbon atoms or a polymerizable group;

$R^6$ is a linear or branched alkylene group having 2 to 8 carbon atoms;

$R^7$ is a linear or branched alkylene group having 2 to 8 carbon atoms, a linear or branched alkylene group having an acetyl group branch and having 3 to 8 carbon atoms, or a linear or branched alkylene group having an ether bond and having 3 to 8 carbon atoms;

X' is a single bond, O, or NH; and

L' is represented by the following formula (2'):

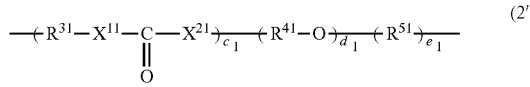

wherein,
- $R^{31}$ is a single bond, a linear or branched alkylene group having 1 to 20 carbon atoms, a cycloalkylene group having 3 to 12 carbon atoms, or an aromatic group having 6 to 12 carbon atoms;
- $R^{41}$ is a linear or branched alkylene group having 1 to 20 carbon atoms, a cycloalkylene group having 3 to 12 carbon atoms, an aromatic group having 6 to 12 carbon atoms, or a dialkylsilyl group having a linear or branched alkyl group having 1 to 20 carbon atoms;
- $R^{51}$ is a linear or branched alkylene group having 1 to 20 carbon atoms, a cycloalkylene group having 3 to 12 carbon atoms, or an aromatic group having 6 to 12 carbon atoms;
- $X^{11}$ and $X^{21}$ are each independently a single bond, O, or NH;
- $c_1$ is an integer of 0 to 50, $d_1$ is an integer of 0 to 50, and $e_1$ is an integer of 0 or 1;
- when $c_1$ is 2 or more, then a "$c_1$" number of divalent groups may be the same as or different from each other;
- when $d_1$ is 2 or more, then a "$d_1$" number of divalent groups may be the same as or different from each other;
- f is an integer of 1 to 50, and g is an integer of 0 to 50;
- when f is 2 or more, then an "f" number of divalent groups may be the same as or different from each other; and
- when g is 2 or more, then a "g" number of divalent groups may be the same as or different from each other.

As a matter of course, in the formula (3), a number average molecular weight of the long chain group is preferably 300 to 10,000, more preferably 300 to 8,000, still more preferably 400 to 5,000, and especially preferably 500 to 2,000.

Of these, especially preferred groups are exemplified below.

$R^6$ is preferably an ethylene group, a propylene group, an isopropylene group, or a butylene group, and especially preferably an isopropylene group, f is preferably 1 to 10, and especially preferably 1.

$R^7$ is especially preferably a butylene group, a pentylene group, or a hexylene group, g is preferably 1 to 10, and especially preferably 2 to 8.

As for L' represented by the formula (2'),
- $R^{31}$ is preferably a single bond or an ethylene group, a propylene group, or a cyclohexylene group, and especially preferably a single bond or an ethylene group.
- $X^{11}$ is preferably a single bond or O.
- $X^{21}$ is preferably a single bond or O or NH.
- $R^{41}$ is preferably an ethylene group, a propylene group, a butylene group, or a dimethylsilyl group, and especially preferably an ethylene group or a dimethylsilyl group.
- $R^{51}$ is preferably a methylene group, an ethylene group, or a propylene group.
- $c_1$ is preferably 0 to 2; $d_1$ is preferably 1 to 45, and especially preferably 5 to 40; and $e_1$ is preferably 0.

Of these, especially preferred groups of L' are exemplified below.

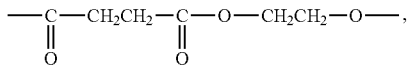

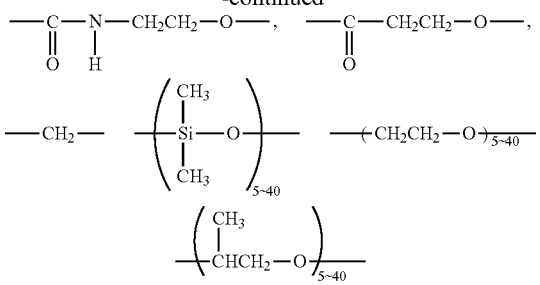

Typical examples of the polymerizable group represented by Z include radical polymerizable groups, such as an acrylic group, a methacrylic group, an allyl group, a vinyl group, and a 4-vinyphenyl group. However, an epoxy group, an episulfide group, a thietanyl group, an OH group, an SH group, an $NH_2$ group, an NCO group, or an NCS group, each functioning as a polymerizable group, may be used according to the type of the polymerizable compound other than the photochromic compound of the present invention.

Here, the epoxy group, the episulfide group, or the thietanyl group reacts with the epoxy group, the episulfide group, the thietanyl group, the $NH_2$ group, or the NCO group which the polymerizable compound other than the photochromic compound of the present invention possesses.

The OH group or the SH group reacts with the NCO group or the NCS group which the polymerizable compound other than the photochromic compound of the present invention possesses, to produce a urethane bond or a thiourethane bond.

The NCO group or the NCS group reacts with the OH group, the SH group, or the $NH_2$ group which the polymerizable compound other than the photochromic compound of the present invention possesses.

(Preferred Number of Groups Having a Photochromic Moiety and Long-Chain Groups, and Preferred Number of Other Groups)

The number of groups having a photochromic moiety capable of being introduced into one molecule of the photochromic compound of the present invention is 1 or more and must be a number of not more than 1 smaller than the whole valence of the polyvalent residue. However, when the foregoing number is too small, the color optical density becomes insufficient, whereas when it is too large, the color optical density is saturated, so that the photochromic moiety cannot be effectively functioned. Thus, the number of groups having a photochromic moiety in one molecule of the photochromic compound is preferably 2 to 9. The number of groups having a photochromic moiety in one molecule of the photochromic compound is an average value.

The number of long-chain groups in one molecule of the photochromic compound is 1 or more and must be a number of not more than 1 smaller than the whole valence of the polyvalent residue. However, when the foregoing number is too small, it becomes difficult to form a free space, whereas when it is too large, the photochromic moiety cannot be effectively functioned. Thus, the number of long-chain groups in one molecule of the photochromic compound is preferably 2 to 16. Furthermore, in the case where the terminal of the long-chain group is a polymerizable group, when the foregoing number is too small, it is difficult to undergo the polymerization alone, and even in the case where the polymerizable compound other than the photochromic compound of the present invention is blended, the long-chain group is not bonded in the cured body and possibly causes bleed-out. Thus, the number of long-chain groups in one molecule of the photochromic compound is preferably 2 to 16. The number of long-chain groups is an average value.

In the present invention, a total number of the number of groups having a photochromic moiety and the number of long-chain groups per molecule of the photochromic compound is preferably 2 to 30. When the foregoing total number is satisfied with this range, a compound having excellent photochromic characteristics can be obtained with productivity. In order to much more enhance this effect, the foregoing total number is more preferably 3 to 20, and still more preferably 5 to 18.

Although the number of long-chain groups relative to the number of groups having photochromic moiety is 1 time or more, in order to more improve the photochromic characteristics, it is preferably 1 to 20 times. When this range is satisfied, it may be considered that a free space can be efficiently formed in the photochromic moiety. As a result, it may be considered that the more excellent photochromic characteristics can be exhibited. In order to make this effect more remarkable, the number of long-chain groups relative to the number of groups having a photochromic moiety is more preferably 1.5 to 10 times, and still more preferably 2 to 5 times.

In the present invention, the whole valence of the polyvalent residue may be a sum total of the number of groups having a photochromic moiety and the number of long-chain groups. However, taking into consideration easiness of production of the photochromic compound itself and suppression of the side-reaction, etc., as for the polyvalent residue, the short-chain group may be substituted, and furthermore, the reactive group, etc. which the polyvalent residue possesses may remain as it is. An optimum proportion of each of the groups varies with the compound forming a polyvalent residue to be used, and it cannot be unequivocally limited. However, taking into consideration easiness of production of the photochromic compound itself, suppression of the side-reaction, and photochromic characteristics, etc., it is preferably in the following range. Specifically, when the whole valence of the polyvalent residue is defined as 100%, it is preferred that the number of groups having a photochromic moiety is 5 to 50%, the number of long-chain groups is 5 to 90%, the number of short-chain groups is 0 to 90%, and the number of reactive groups, etc. remaining without being reacted (reactive group, etc. which the polyvalent residue possesses) is 0 to 90%. Furthermore, it is more preferred that the number of groups having a photochromic moiety is 10 to 20%, the number of long-chain groups is 30 to 50%, the number of short-chain groups is 0 to 50%, and the number of reactive groups, etc. remaining without being reacted (reactive group, etc. which the polyvalent residue possesses) is 0 to 50%.

In the case where the compound forming a polyvalent residue is a cyclodextrin, a photochromic compound in which among the side chains bonding to the cyclodextrin, the group (side chain) having a photochromic moiety accounts for 5 to 50%, preferably 10 to 30%, and more preferably 10 to 20%, and the long-chain group accounts for 5 to 90%, preferably 10 to 50%, and more preferably 30 to 50% is especially preferred from standpoint of giving excellent photochromic properties. However, as described above, it is not the case where the side chain (including the first side chain) is introduced into all of the reactive groups, etc. in the polyvalent residue (hydroxy group of the cyclodextrin). Namely, the aforementioned proportion is a proportion in which the photochromic moiety has been introduced into the side chain introduced into the hydroxy group of the cyclodextrin and a proportion in which the side chain has become the long-chain group.

As mentioned above, the photochromic moiety and the polymerizable group may not be introduced into all of the side chains (including the first side chain) introduced into the cyclodextrin, and furthermore, the foregoing side chains may not be a long-chain group. However, in the case where the polymerizable group is introduced into the terminal of the long-chain group, the following is preferred. For example, in the case where the polymerizable group of the polymerizable compound is a radical polymerizable group, as for the photochromic compound to be combined, taking into consideration productivity, photochromic characteristics, and polymerizability with other polymerizable compound, among the side chains bonding to the cyclodextrin, the side chain (group) having a photochromic moiety accounts for 5 to 50%, the long-chain group (side chain) having a radical polymerizable group accounts for 5 to 90%, the short-chain group accounts for 0 to 90%, and the hydroxy group remaining without being reacted accounts for 0 to 90%. Furthermore, it is more preferred that the side chain (group) having a photochromic moiety accounts for 10 to 20%, the long-chain group (side chain) having a radical polymerizable group accounts for 30 to 50%, the short-chai group accounts for 0 to 50%, and the hydroxy group remaining without being reacted accounts for 0 to 50%.

Although the photochromic compound of the present invention is not particularly restricted, a weight average molecular weight (Mw) as measured by the method described in the section of Examples as mentioned later is, for example, 2,000 or more, and preferably 2,000 to 50,000. In particular, for the purposes of improving compatibility with other polymerizable compound and introducing a large number of photochromic moieties without excessively increasing the monomer viscosity before curing to provide excellent effects, the weight average molecular weight Mw of the photochromic compound is more preferably 2,000 to 30,000, and especially preferably 3,000 to 20,000.

(Production Method of Photochromic Compound)

Although the photochromic compound of the present invention is not restricted with respective to its production method, it can be produced by the following method.

The polyvalent residue (compound forming a polyvalent residue) is first produced by a known method. Subsequently, the first side chain is introduced into the polyvalent residue by a known method. At this time, the terminal of the first side chain is preferably the reactive group (for example, an OH group). Of such reactive groups, the case where the group has not reacted is corresponding to the "reactive group, etc. remaining without being reacted".

Separately, at least a group having a photochromic moiety and capable of reacting with the first side chain is introduced into the photochromic moiety. Preferably this group is a group forming the above L.

The photochromic compound of the present invention can be produced by reacting the polyvalent residue having the first side chain with the group capable of forming the above L. The photochromic moiety and the first side chain may be directly reacted with each other (in this case, L is a single bond). In the case where not only the molecular weight of the first side chain is less than 300, but also the photochromic moiety has not been introduced, the group becomes a short-chain group. In addition, as a matter of course, even when the polymerizable group would have been introduced into the first side chain, in the case where the molecular weight is less than 300, the group is corresponding to the short-chain group.

The reaction between the group capable of forming the above L and the terminal of the first side chain is not particularly restricted. For example, in the case where the terminal of the first side chain is an OH group, the above L can be formed by conducting an esterification reaction with a compound having a carboxylic acid at the terminal. Specifically, the reaction can be conducted in a solvent, such as toluene, in the presence of a mineral acid, such as sulfuric acid and hydrochloric acid, an organic acid, such as an aromatic sulfonic acid, or a Lewis acid, such as a fluorinated boron ether, by stirring under heating, if desired and removing the produced water by azeotrope. Examples of a method of removing water in the aforementioned esterification reaction include a method in which water is removed with a desiccant, such as anhydrous magnesium sulfate or molecular sieves; and a method in which water is removed in the presence of a dehydrating agent typified by dicyclohexyl carbodiimide or the like.

The above L can also be formed by conducting an esterification reaction with a compound having a carboxylic acid halide at the terminal. Specifically, a method in which the produced hydrogen halide is removed by stirring under heating, if desired in an ether-based solvent, such as tetrahydrofuran, in the presence of a base, such as pyridine and dimethylaniline, can be adopted.

Furthermore, the above L can be formed by conducting an esterification reaction with a compound having an acid anhydride at the terminal. Specifically, a method in which the reaction is conducted by stirring under heating, if desired in a solvent, such as toluene, in the presence of a catalyst, such as sodium acetate and pyridine, can be adopted.

As an alternative method, the above L can be formed by conducting a urethanization reaction with a compound having an NCO group at the terminal. Specifically, a method in which the reaction is conducted by stirring under heating, if desired without using a solvent or in a solvent, such as toluene, in the presence of an amine-based catalyst, such as triethylenediamine, or a tin-based catalyst, such as dibutyltin dilaurate, can be adopted.

As a method of introducing the long-chain group having a polymerizable group (the group may also be a short-chain group), the same method as the aforementioned method can be adopted. A compound prepared by replacing the photochromic moiety with the polymerizable group may be reacted with the group capable of forming the above L'. In addition, in the case where the reactive group at the terminal of the first side chain is the polymerizable group in the present invention, the foregoing reactive group can be used as the polymerizable group as it is.

(Polymerizable Compound Other than Photochromic Compound)

In the curable composition of the present invention, the aforementioned photochromic compound (hereinafter also referred to as "photochromic compound (A)") and optionally, a polymerizable compound other than the aforementioned photochromic compound can be blended. Examples of the polymerizable compound (occasionally referred to as "component (B)") include a radical polymerizable compound (B1), an epoxy-based polymerizable compound (B2), a urethane- or urea-based polymerizable compound (B3) capable of forming a urethane bond or a urea bond, and a polymerizable compound (B4) other than the polymerizable compounds (B1) to (B3). In particular, in the case where a polymerizable group is introduced into the photochromic compound, a polymerizable compound capable of reacting with this polymerizable group is preferably used.

(B1) Radical Polymerizable Compound:

In particular, in the case where a radical polymerizable functional group is introduced into the long-chain group or short-chain group, especially the long-chain group of the photochromic compound, the radical polymerizable compound (B1) is preferably used. The radical polymerizable compound (B1) is roughly classified into (B1-1) a (meth) acrylic polymerizable compound having a (meth)acrylic group, (B1-2) a vinyl-based polymerizable compound having a vinyl group, (B1-3) an allyl-based polymerizable compound having an allyl group, and (B1-4) a silsesquioxane-based polymerizable compound.

Specific examples thereof are given below.

(B1) Examples of Meth(acrylic) Polymerizable Compound:

(B1-1-1) Bifunctional (Meth)acrylic Polymerizable Compound:

The photochromic polymerizable composition of the present invention preferably contains (B1-1-1) a bifunctional (meth)acrylic polymerizable compound. Specific examples thereof are given below. Specifically, compounds represented by the following formulae (5), (6), and (7) are exemplified. The compound represented by the following formula (5) is hereinafter occasionally referred to simply as "component (B1-1-1)"; the compound represented by the following formula (6) is hereinafter occasionally referred to simply as "component (B1-1-2)"; and the compound represented by the following formula (7) is hereinafter occasionally referred to simply as "component (B1-1-3)". Besides, a bifunctional (meth)acrylic polymerizable compound having a urethane bond (hereinafter occasionally referred to simply as "component (B1-1-4)"; and a bifunctional (meth)acrylic polymerizable compound not corresponding to the component (B1-1-1), the component (B1-1-2), the component (B1-1-3), and the component (B1-1-4) (the foregoing bifunctional (meth)acrylic polymerizable compound will be hereinafter occasionally referred to simply as "(B1-1-5) component") are described.

(B1-1-1) Compound Represented by the Following Formula (5):

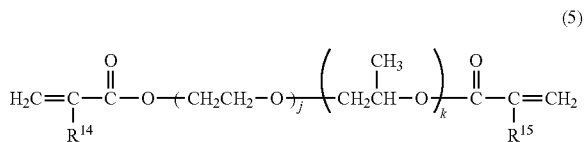

(5)

In the formula, $R^{14}$ and $R^{15}$ are each a hydrogen atom or a methyl group; j and k are each independently an integer of 0 or more; and (j+k) is 2 or more and 50 or less in terms of an average value.

The polymerizable compound represented by the formula (5) is typically obtained in the form of a mixture of molecules having a different molecular weight from each other. Therefore, j and k are each expressed in terms of an average value.

Specifically, examples of the compound represented by the formula (5) are given below.

Diethylene glycol dimethacrylate, triethylene glycol dimethacrylate, tetraethylene glycol dimethacrylate, pentaethylene glycol dimethacrylate, pentapropylene glycol dimethacrylate, diethylene glycol diacrylate, triethylene glycol diacrylate, tetraethylene glycol diacrylate, pentaethylene glycol diacrylate, tripropylene glycol diacrylate, tetrapropylene glycol diacrylate, pentapropylene glycol diacrylate, a dimethacrylate composed of a mixture of polypropylene glycol and polyethylene glycol (polyethylene has two recurring units, and polypropylene has two recurring units), polyethylene glycol dimethacrylate (especially, average molecular weight: 330), polyethylene glycol dimethacrylate (especially, average molecular weight: 536), polyethylene glycol dimethacrylate (especially, average molecular weight: 736), tripropylene glycol dimethacrylate, tetrapropylene glycol dimethacrylate, polypropylene glycol dimethacrylate (especially, average molecular weight: 536), polyethylene glycol diacrylate (especially, average molecular weight: 258), polyethylene glycol diacrylate (especially, average molecular weight: 308), polyethylene glycol diacrylate (especially, average molecular weight: 508), polyethylene glycol diacrylate (especially, average molecular weight: 708), and polyethylene glycol methacrylate acrylate (especially, average molecular weight: 536).

(B1-1-1-2) Compound Represented by the Following Formula (6):

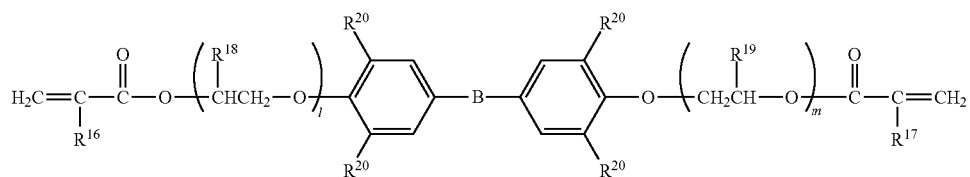

(6)

In the formula, $R^{16}$ and $R^{17}$ are each a hydrogen atom or a methyl group;

$R^{18}$ and $R^{19}$ are each a hydrogen atom or a methyl group;

$R^{20}$ is a hydrogen atom or a halogen atom;

B is any one of —O—, —S—, —(SO$_2$)—, —CO—, —CH$_2$—, —CH=CH—, —C(CH$_3$)$_2$—, and —C(CH$_3$)(C$_6$H$_5$)—; and l and m are each an integer of 1 or more, and (l+m) is 2 or more and 30 or less in terms of an average value.

The polymerizable compound represented by the formula (6) is typically obtained in the form of a mixture of molecules having a different molecular weight from each other. Therefore, l and m are each expressed in terms of an average value.

Specific examples of the compound represented by the formula (6) include the following bisphenol A di(meth)acrylates.

2,2-Bis[4-methacryloyloxy-ethoxy)phenyl]propane ((l+m)=2), 2,2-bis[4-methacryloyloxy-diethoxy)phenyl]propane ((l+m)=4), 2,2-bis[4-methacryloyloxy-polyethoxy)phenyl]propane ((l+m)=7), 2,2-bis(3,5-dibromo-4-methacryloyloxyethoxyphenyl)propane ((l+m)=2), 2,2-bis(4-methacryloyloxydipropoxyphenyl)propane ((l+m)=4), 2,2-bis[4-acryloyloxy-diethoxy)phenyl]propane ((l+m)=4), 2,2-bis[4-acryloyloxy-polyethoxy)phenyl]propane ((l+m)=3), 2,2-bis[4-acryloyloxy-polyethoxy)phenyl]propane ((l+m)=7), 2,2-bis[4-methacryloyloxy(polyethoxy)phenyl]propane ((l+m)=10), 2,2-bis[4-methacryloyloxy(polyethoxy)phenyl]propane ((l+m)=17), 2,2-bis[4-methacryloyloxy(polyethoxy)phenyl]propane ((l+m)=30), 2,2-bis[4-acryloyloxy(polyethoxy)phenyl]propane ((l+m)=10), and 2,2-bis[4-acryloyloxy(polyethoxy)phenyl]propane ((l+m)=20).

(B1-1-1-3) Compound Represented by the Following Formula (7):

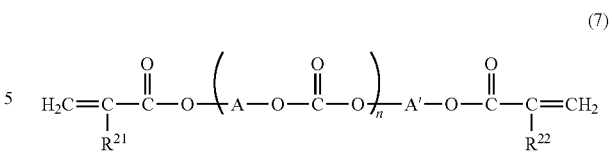

(7)

In the formula, $R^{21}$ and $R^{22}$ are each a hydrogen atom or a methyl group;

n is a number of 1 to 20 in terms of an average value; and

A and A' may be the same as or different from each other and are each a linear or branched alkylene group having 2 to 15 carbon atoms, and in the case where plural A's are present, the plural A's may be the same group or may be a group different from each other.

The compound represented by the formula (7) can be produced by reacting a polycarbonate diol with (meth)acrylic acid.

Here, examples of the polycarbonate diol which is used are given below. Specifically, examples thereof include polycarbonate diols (number average molecular weight: 500 to 2,000) obtained through phosgenation of a polyalkylene glycol, such as trimethylene glycol, tetramethylene glycol, pentamethylene glycol, hexamethylene glycol, octamethylene glycol, and nonamethylene glycol;

polycarbonate diols (number average molecular weight: 500 to 2,000) obtained through phosgenation of a mixture of two or more polyalkylene glycols, for example, a mixture of trimethylene glycol and tetramethylene glycol, a mixture of tetramethylene glycol and hexamethylene glycol, a mixture of pentamethylene glycol and hexamethylene glycol, a mixture of tetramethylene glycol and octamethylene glycol, and a mixture of hexamethylene glycol and octamethylene glycol; and polycarbonate diols (number average molecular weight: 500 to 2,000) obtained through phosgenation of 1-methyl trimethylene glycol.

(B1-1-1-4) Bifunctional (Meth)acrylic Polymerizable Compound Having a Urethane Bond:

A typical example of the component (B1-1-1-4) is a reaction product of a polyol and a polyisocyanate. Here, examples of the polyisocyanate include hexamethylene diisocyanate, isophorone diisocyanate, lysine isocyanate, 2,2,4-hexamethylene diisocyanate, dimeric acid diisocyanate, isopropylidenebis-4-cyclohexyl isocyanate, dicyclohexyl methane diisocyanate, norbornene diisocyanate, norbornene methane diisocyanate, and methyl cyclohexane diisocyanate.

Meanwhile, examples of the polyol include polyalkylene glycols having the recurring unit of ethylene oxide having 2 to 4 carbon atoms, propylene oxide, or hexamethylene oxide, and polyester diols, such as polycaprolactone diol. In addition, examples thereof include polycarbonate diols, polybutadiene diols, ethylene glycol, propylene glycol, 1,3-propanediol, 1,4-butanediol, 1,5-pentanediol, 1,6-hexanediol, 1,9-nonanediol, 1,8-nonanediol, neopentyl glycol, diethylene glycol, dipropylene glycol, 1,4-cyclohexanediol, and 1,4-cyclohexane dimethanol.

Urethane (meth)acrylates which are a reaction mixture obtained by further reacting a urethane prepolymer obtained through a reaction of a polyisocyanate and a polyol, with 2-hydroxy (meth)acrylate, and which are a reaction mixture obtained by directly reacting the diisocyanate with 2-hydroxy (meth)acrylate can also be used.

Examples of the bifunctional (meth)acrylic polymerizable compound having a urethane bond include U-2PPA (molecular weight: 482), UA-122P (molecular weight: 1,100), U-122P (molecular weight: 1,100), U-108A, U-200PA, UA-511, U-412A, UA-4100, UA-4200, UA-4400, UA-2235PE, UA-160TM, UA-6100, UA-6200, U-108, UA-4000, and UA-512, all of which are manufactured by Shin-Nakamura Chemical Co., Ltd.; EB4858 (molecular weight: 454), manufactured by Daicel-UCB Co., Ltd.; and UX-2201, UX3204, UX4101, 6101, 7101, and 8101, all of which are manufactured by Nippon Kayaku Co., Ltd.

(B1-1-1-5) Other Bifunctional (Meth)acrylic Polymerizable Compound:

Examples of the component (B1-1-1-5) include compounds having a (meth)acrylic group at both terminals of an alkylene group which may have a substituent. Compounds having an alkylene group having 6 to 20 carbon atoms are preferred as the component (B1-1-1-5). Specifically examples thereof include 1,6-hexanediol diacrylate, 1,6-hexanediol dimethacrylate, 1,9-nonanediol diacrylate, 1,9-nonanediol dimethacrylate, 1,10-decanediol diacrylate, and 1,10-decanediol dimethacrylate.

Besides, examples of the component (B1-1-1-5) include bifunctional (meth)acrylate monomers containing a sulfur atom. The sulfur atom preferably forms a part of a molecular chain as a sulfide group. Specifically, examples thereof include bis(2-methacryloyloxyethylthioethyl)sulfide, bis(methacryloyloxyethyl)sulfide, bis(acryloyloxyethyl)sulfide, 1,2-bis(methacryloyloxyethylthio)ethane, 1,2-bis(acryloyloxyethyl)ethane, bis(2-methacryloyloxyethylthioethyl) sulfide, bis(2-acryloyloxyethylthioethyl) sulfide, 1,2-bis(methacryloyloxyethylthioethylthio)ethane, 1,2-bis(acryloyloxyethylthioethylthio)ethane, 1,2-bis(methacryloyloxyisopropylthioisopropyl)sulfide, and 1,2-bis(acryloyloxyisopropylthioisopropyl) sulfide.

With respect to each of the foregoing component (B1-1-1-1), component (B1-1'1-2), component (B1-1-1-3), component (B1-1-1-4), and component (B1-1-1-5), one component or plural components described above may be used. In the case where a plurality of the compounds are used, the mass of the component (B1-1-1) as a basis is the total amount of the compounds.

Next, a polyfunctional (meth)acrylic polymerizable compound (B1-1-2) is described.

(B1-1-2) Polyfunctional (Meth)acrylic Polymerizable Compound

Examples of the component (B1-1-2) include a compound represented by the following formula (8) (hereinafter occasionally referred to simply as "(B1-1-2-1) component"), a polyfunctional (meth)acrylic polymerizable compound having a urethane bond (hereinafter occasionally referred to simply as "(B1-1-2-2) component"), and a polyfunctional (meth)acrylic polymerizable compound not corresponding to the component (B1-1-2-1) and the component (B1-1-2-2) (the foregoing polyfunctional (meth)acrylic polymerizable compound will be hereinafter occasionally referred to simply as "(B1-1-2-3) component").

(B1-1-2-1) Compound Represented by the Following Formula (8):

Examples of the polyfunctional (meth)acrylic polymerizable compound include a compound represented by the following formula (8).

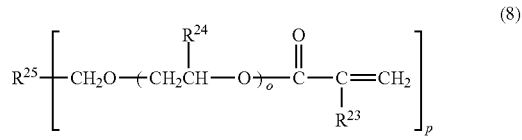

In the formula,
$R^{23}$ is a hydrogen atom or a methyl group;
$R^{24}$ is a hydrogen atom or an alkyl group having 1 to 2 carbon atoms;
$R^{25}$ is a trivalent to hexavalent organic group having 1 to 10 carbon atoms; and
is a number of 0 to 3 in terms of an average value, and p is a number of 3 to 6 in terms of an average value.

The alkyl group having 1 to 2 carbon atoms represented by $R^{24}$ is preferably a methyl group. Examples of the organic group represented by $R^{25}$ include a group derived from a polyol, a trivalent to hexavalent hydrocarbon group, and a trivalent to hexavalent organic group containing a urethane bond.

Specifically, examples of the compound represented by the formula (8) include trimethylolpropane trimethacrylate, trimethylolpropane triacrylate, tetramethylolmethane trimethacrylate, tetramethylolmethane triacrylate, tetramethylolmethane tetramethacrylate, tetramethylolmethane tetraacrylate, trimethylolpropane triethylene glycol trimethacrylate, trimethylolpropane triethylene glycol triacrylate, ditrimethylolpropane tetramethacrylate, and ditrimethylolpropane tetraacrylate.

(B1-1-2-2) Polyfunctional (Meth)acrylic Polymerizable Compound Having a Urethane Bond:

The component (B1-1-2-2) is a compound obtained by reacting a polyisocyanate compound as explained for the component (B1-1-1-4) with a polyol compound, such as glycerin, trimethylolpropane, pentaerythritol, and dipentaerythritol, and having three or more (meth)acrylate groups in a molecule thereof. Examples of a commercially available product thereof include U-4HA (molecular weight: 596, number of functional groups: 4), U-6HA (molecular weight: 1,019, number of functional groups: 6), U-6LPA (molecular weight: 818, number of functional groups: 6), and U-15HA (molecular weight: 2,300, number of functional groups: 15), all of which are manufactured by Shin-Nakamura Chemical Co., Ltd.

(B1-1-2-3) Other Polyfunctional (Meth)acrylic Polymerizable Compound:

The component (B1-1-2-3) is a compound obtained by modifying the terminal of a polyester compound with a (meth)acrylic group. Various commercially available polyester (meth)acrylate compounds which vary with the molecular weight of a polyester compound as a raw material and the modification amount of the (meth)acrylic group can be used. Specifically, examples thereof include tetrafunctional polyester oligomers (molecular weight: 2,500 to 3,500, EB80, manufactured by Daicel-UCB Co., Ltd., etc.), hexafunctional polyester oligomers (molecular weight: 6,000 to 8,000, EB450 manufactured by Daicel-UCB Co., Ltd., etc.), hexafunctional polyester oligomers (molecular weight: 45,000 to 55,000, EB1830, manufactured by Daicel-UCB Co., Ltd., etc.), and tetrafunctional polyester oligomers (especially, GX8488B, manufactured by DKS Co., Ltd., having a molecular weight of 10,000, etc.).

When the component (B1-1-2) ((component (B1-1-2-1), component (B-1-1-2-2), or component (B1-1-2-3)) as exemplified above is used, a crosslinking density is improved by polymerization, thereby making it possible to increase the surface hardness of the obtained cured body. In consequence, in particular, in order to obtain a photochromic cured body (laminate) by the coating method, the component (B1-1-2) is preferably contained. In particular, among the components (B1-1-2), the component (B1-1-2-1) is preferably used.

In the foregoing component (B1-1-2-1), component (B1-1-2-2), and component (B1-1-2-3) can be used alone, and a plurality of the above-described components can be used. In the case where a plurality of the compounds are used, the mass of the component (B1-1-2) as a basis is the total amount of the compounds.

Next, a monofunctional (meth)acrylic polymerizable compound (B1-1-3) is described.

(B1-1-3) Monofunctional (Meth)acrylic Polymerizable Compound:

Examples of the component (B1-1-3) include a compound represented by the following formula (9).

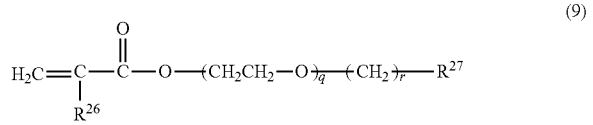

(9)

In the formula, $R^{26}$ is a hydrogen atom or a methyl group; $R^{27}$ is a hydrogen atom, a methyldimethoxysilyl group, a trimethoxysilyl group, or a glycidyl group; q is an integer of 0 to 10; and r is an integer of 0 to 20.

Specifically, examples of the compound represented by the formula (9) are given below.

Methoxy polyethylene glycol methacrylate (especially, average molecular weight: 293), methoxy polyethylene glycol methacrylate (especially, average molecular weight: 468), methoxy polyethylene glycol acrylate (especially, average molecular weight: 218), methoxy polyethylene glycol acrylate (especially, average molecular weight: 454), stearyl methacrylate, lauryl methacrylate, methyl acrylate, ethyl acrylate, butyl acrylate, octyl acrylate, lauryl acrylate, γ-methacryloyloxypropyl trimethoxysilane, γ-methacryloyloxypropylmethyl dimethoxysilane, and glycidyl methacrylate.

(B1-2) Vinyl-Based Polymerizable Compound:

Examples of the vinyl-based polymerizable compound having a vinyl group include methyl vinyl ketone, ethyl vinyl ketone, ethyl vinyl ether, styrene, vinyl cyclohexane, butadiene, 1,4-pentadiene, divinyl sulfide, divinyl sulfone, 1,2-divinylbenzene, 1,3-divinyl-1,1,3,3-tetramethylpropane disiloxane, diethylene glycol divinyl ether, divinyl adipate, divinyl sebacate, ethylene glycol divinyl ether, divinyl sulfoxide, divinyl persulfide, dimethyl divinylsilane, 1,2,4-trivinyl cyclohexane, methyl trivinylsilane, α-methylstyrene, and an α-methylstyrene dimer.

Among the above-exemplified vinyl-based polymerizable compounds, α-methylstyrene and an α-methylstyrene dimer function as a polymerization regulator and improve the moldability of the photochromic composition.

(B1-3) Allyl-Based Polymerizable Compound:

Examples of the allyl-based polymerizable compound having an allyl group are given below. Diethylene glycol bisallyl carbonate, methoxy polyethylene glycol allyl ether (especially, average molecular weight: 550), methoxy polyethylene glycol allyl ether (especially, average molecular weight: 350), methoxy polyethylene glycol allyl ether (especially, average molecular weight: 1,500), polyethylene glycol allyl ether (especially, average molecular weight: 450), methoxy polyethylene glycol-polypropylene glycol allyl ether (especially, average molecular weight: 750), butoxy polyethylene glycol-polypropylene glycol allyl ether (especially, average molecular weight: 1,600), methacryloyloxy polyethylene glycol-polypropylene glycol allyl ether (especially, average molecular weight: 560), phenoxy polyethylene glycol allyl ether (especially, average molecular weight: 600), methacryloyloxy polyethylene glycol allyl ether (especially, average molecular weight: 430), acryloyloxy polyethylene glycol allyl ether (especially, average molecular weight: 420), vinyloxy polyethylene glycol allyl ether (especially, average molecular weight: 560), styryloxy polyethylene glycol allyl ether (especially, average molecular weight: 650), and methoxy polyethylene thioglycol allyl thioether (especially, average molecular weight: 730).

The allyl-based polymerizable compound acts as a chain transfer agent, and therefore, it is possible to improve the photochromic properties (color optical density and fading speed) of the curable composition.

(B1-4) Silsesquioxane Polymerizable Compound:

The silsesquioxane polymerizable compound may take a variety of molecular structures, such as a cage-like, ladder-like, or random form and has a radical polymerizable group, such as a (meth)acrylic group.

Examples of the silsesquioxane polymerizable compound include a compound represented by the following formula (10).

(10)

In the formula, s is a degree of polymerization and an integer of 3 to 100; and plural $R^{28}$'s may be the same as or different from each other and are each a radical polymerizable group, an organic group containing a radical polymerizable group, a hydrogen atom, an alkyl group, a cycloalkyl group, an alkoxy group, or a phenyl group, and at least one $R^{28}$ is a radical polymerizable group or an organic group containing a radical polymerizable group.

Examples of the radical polymerizable group or the organic group containing a radical polymerizable group represented by $R^{28}$ include a (meth)acrylic group; an organic groups having a (meth)acrylic group, such as a (meth)acryloyloxypropyl group and a (3-(meth)acryloyloxypropyl) dimethylsiloxy group; an allyl group; an organic groups having an allyl group, such as an allylpropyl group and an allylpropyldimethylsiloxy group; a vinyl group; and an organic groups having a vinyl group, such as a vinylpropyl group and a vinyldimethylsiloxy group.

(B2) Epoxy-Based Polymerizable Compound:

This polymerizable compound has an epoxy group as a polymerizable group in a molecule thereof, and in particular, it is especially preferred in the case where a hydroxy group, an NH$^2$ group, or an NCO group is introduced as a polymerizable functional group into the side chain of the photochromic compound (A).

The epoxy-based polymerizable compound is roughly classified into an aliphatic epoxy compound, an alicyclic epoxy compound, and an aromatic epoxy compound, and examples thereof are given below.

Examples of the aliphatic epoxy compound include ethylene oxide, 2-ethyloxirane, butyl glycidyl ether, phenyl glycidyl ether, 2,2'-methylene bisoxirane, 1,6-hexanediol diglycidyl ether, ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycol diglycidyl ether, tripropylene glycol diglycidyl ether, tetrapropylene glycol diglycidyl ether, nonapropylene glycol diglycidyl ether, neopentyl glycol diglycidyl ether, trimethylolpropane triglycidyl ether, glycerol triglycidyl ether, diglycerol tetraglycidyl ether, pentaerythritol tetraglycidyl ether, a diglycidyl ether of tris(2-hydroxyethyl)isocyanurate, and a triglycidyl ether of tris(2-hydroxyethyl)isocyanurate.

Examples of the alicyclic epoxy compound include isophoronediol diglycidyl ether and bis-2,2-hydroxycyclohexylpropane diglycidyl ether.

Examples of the aromatic epoxy compound include resorcin diglycidyl ether, bisphenol A diglycidyl ether, bisphenol F diglycidyl ether, bisphenol S diglycidyl ether, orthophthalic acid diglycidyl ester, phenol novolak polyglycidyl ether, and cresol novolak polyglycidyl ether.

Besides the above compounds, an epoxy-based polymerizable compound having a sulfur atom in a molecule thereof together with an epoxy group can also be used. Such a sulfur atom-containing epoxy-based polymerizable compound especially contributes to an improvement of a refractive index, and examples thereof include linear aliphatic and cyclic aliphatic compounds. Specific examples thereof are given below.

Examples of the linear aliphatic sulfur atom-containing epoxy-based polymerizable compound include bis(2,3-epoxypropyl)sulfide, bis(2,3-epoxypropyl)disulfide, bis(2,3-epoxypropylthio)methane, 1,2-bis(2,3-epoxypropylthio)ethane, 1,2-bis(2,3-epoxypropylthio)propane, 1,3-bis(2,3-epoxypropylthio)propane, 1,3-bis(2,3-epoxypropylthio)-2-methylpropane, 1,4-bis(2,3-epoxypropylthio)butane, 1,4-bis(2,3-epoxypropylthio)-2-methylbutane, 1,3-bis(2,3-epoxypropylthio)butane, 1,5-bis(2,3-epoxypropylthio)pentane, 1,5-bis(2,3-epoxypropylthio)-2-methylpentane, 1,5-bis(2,3-epoxypropylthio)-3-thiapentane, 1,6-bis(2,3-epoxypropylthio)hexane, 1,6-bis(2,3-epoxypropylthio)-2-methylhexane, 3,8-bis(2,3-epoxypropylthio)-3,6-dithiaoctane, 1,2,3-tris(2,3-epoxypropylthio)propane, 2,2-bis(2,3-epoxypropylthio)-1,3-bis(2,3-epoxypropylthiomethyl)propane, and 2,2-bis(2,3-epoxypropylthiomethyl)-1-(2,3-epoxypropylthio)butane.

Examples of the cyclic aliphatic sulfur atom-containing epoxy-based polymerizable compound include 1,3-bis(2,3-epoxypropylthio)cyclohexane, 1,4-bis(2,3-epoxypropylthio)cyclohexane, 1,3-bis(2,3-epoxypropylthiomethyl)cyclohexane, 1,4-bis(2,3-epoxypropylthiomethyl)cyclohexane, 2,5-bis(2,3-epoxypropylthiomethyl)-1,4-dithiane, 2,5-bis(<2-(2,3-epoxypropylthio)ethyl>thiomethyl)-1,4-dithiane, and 2,5-bis(2,3-epoxypropylthiomethyl)-2,5-dimethyl-1,4-dithiane.

(B3) Urethane-Based Polymerizable Compound (Including Urea-Based Polymerizable Compound):

The polymerization recurring unit of this polymerizable compound is linked by a urethane bond or a urea bond, and the compound is especially effective in the case where an epoxy group, an episulfide group, a thietanyl group, an OH group, an SH group, an NH$_2$ group, an NCO group, or an NCS group is introduced as a polymerizable functional group into the side chain of the photochromic compound (A).

For example, the urethane bond is formed through a reaction between a polyol and a polyisocyanate and includes a thiourethane bond formed through a reaction between a polyol and a polyisothiocyanate or a reaction between a polythiol and a polyisothioisocyanate.

The urea bond is formed through a reaction between a polyamine and a polyisocyanate and includes a thiourea bond formed through a reaction between a polyamine and a polyisothiacyanate.

As understood from the aforementioned explanation, in the present invention, a plurality of compounds are selected from a polyol (B3-1), a polythiol (B3-2), a polyamine (B3-3), a polyisocyanate (B3-4), and a polyisothiacyanate (B3-5) and used as the urethane- or urea-based polymerizable compounds so as to form the aforementioned urethane bond (thiourethane bond) or urea bond (thiourea bond).

In the case where a hydroxy group, a mercapto group (SH group), an NH$_2$ group, or an NCO group is introduced as the polymerizable group into the side chain of the aforementioned polyrotaxane, the side chain is incorporated into a polymerization chain formed by the urethane- or urea-based polymerizable compound (the both will be hereinafter occasionally collectively referred to simply as "urethane-based polymerizable compound"), and hence, such is preferred.

As a compound to be used as one kind of such a urethane-based polymerizable compound, specifically, the following compounds are used.

(B3-1) Polyol:

The polyol is a compound having at least two OH groups in one molecule thereof, and typical examples thereof include a di-, tri-, tetra-, penta-, or hexa-hydroxy compound, a polyester having at least two OH groups in one molecule thereof (polyester polyol), a polyether having at least two OH groups in one molecule thereof (hereinafter referred to as "polyether polyol"), a polycarbonates having at least two OH groups in one molecule thereof (polycarbonate polyol), a polycaprolactone having at least two OH groups in one molecule thereof (polycaprolactone polyol), and an acrylic polymer having at least two OH groups in one molecule thereof (polyacrylic polyol).

Examples of these compounds are given below.

Examples of an aliphatic alcohol include ethylene glycol, diethylene glycol, propylene glycol, dipropylene glycol, butylene glycol, neopentyl glycol, glycerin, trimethylolethane, trimethylolpropane, butanetriol, 1,2-methyl glycoside, pentaerythritol, dipentaerythritol, tripentaerythritol, sorbitol, erythritol, threitol, ribitol, arabinitol, xylitol, allitol, mannitol, dorcitol, iditol, glycol, inositol, hexanetriol, triglycerol, diglycerol, triethylene glycol, polyethylene glycol, tris(2-hydroxyethyl)isocyanurate, cyclobutanediol, cyclopentanediol, cyclohexanediol, cycloheptanediol, cyclooctanediol, cyclohexanedimethanol, hydroxypropyl cyclohexanol, tricyclo[5,2,1,0,2,6]decane-dimethanol, bicyclo[4,3,0]-nonanediol, dicyclohexanediol, tricyclo[5,3,1,1]dodecanediol, bicyclo[4,3,0]nonanedimethanol, tricyclo[5,3,1,1]dodecane-diethanol, hydroxypropyl tricyclo[5,3,1,1]

dodecanol, spiro[3,4]octanediol, butyl cyclohexanediol, 1,1'-bicyclohexylidenediol, cyclohexanetriol, maltitol, and lactitol.

Examples of an aromatic alcohol include dihydroxynaphthalene, trihydroxynaphthalene, tetrahydroxynaphthalene, dihydroxybenzene, benzenetriol, biphenyltetraol, pyrogallol, (hydroxynaphthyl)pyrogallol, trihydroxyphenanthrene, bisphenol A, bisphenol F, xylylene glycol, and tetrabromobisphenol A.

Examples of a sulfur-containing polyol include bis-[4-(hydroxyethoxy)phenyl]sulfide, bis-[4-(2-hydroxypropoxy)phenyl]sulfide, bis-[4-(2,3-dihydroxypropoxy)phenyl]sulfide, bis-[4-(4-hydroxycyclohexyloxy)phenyl]sulfide, and bis-[2-methyl-4-(hydroxyethoxy)-6-butylphenyl]sulfide.

Examples of a compound obtained by adding three or less molecules in average per hydroxy group of ethylene oxide and/or propylene oxide to the aforementioned sulfur-containing polyol include di-(2-hydroxyethyl)sulfide, bis(2-hydroxyethyl)disulfide, 1,4-dithiane-2,5-diol, bis(2,3-dihydroxypropyl)sulfide, tetrakis(4-hydroxy-2-thiabutyl)methane, bis(4-hydroxyphenyl)sulfone, tetrabromobisphenol S, tetramethylbisphenol S, 4,4'-thiobis(6-tert-butyl-3-methylphenol), and 1,3-bis(2-hydroxyethylthioethyl)-cyclohexane.

Examples of the polyester polyol include a compound obtained through a condensation reaction between a polyol and a polybasic acid.

Examples of the polyether polyol include a compound obtained through a reaction between a compound having at least two active hydrogen-containing groups in a molecule thereof and an alkylene oxide, and a modified product thereof.

Examples of the polycaprolactone polyol include a compound obtained through ring-opening polymerization of ε-caprolactone.

Examples of the polycarbonate polyol include a compound obtained through phosgenation of at least one low-molecular weight polyol and a compound obtained through transesterification using ethylene carbonate, diethyl carbonate, or diphenyl carbonate.

Examples of the polyacrylic polyol include a compound obtained through copolymerization of an acrylic acid ester or a methacrylic acid ester containing a hydroxy group and a monomer copolymerizable with such an ester.

(B3-2) Polythiol:

The polythiol is a compound having at least two SH groups in one molecule thereof, and specifically, examples thereof include the following compounds.

Examples of an aliphatic polythiol include methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, tetrakis(mercaptomethyl)methane, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, bicyclo[2,2,1]hepta-exo-cis-2,3-dithiol, 1,1-bis(mercaptomethyl)cyclohexane, thiomalic acid bis(2-mercaptoethyl ester), 2,3-dimercaptosuccinic acid (2-mercaptoethyl ester), 2,3-dimercapto-1-propanol(2-mercaptoacetate), 2,3-dimercapto-1-propanol(3-mercaptoacetate), diethylene glycol bis(2-mercaptoacetate), diethylene glycol bis(3-mercaptopropionate), 1,2-dimercaptopropylmethyl ether, 2,3-dimercaptopropylmethyl ether, 2,2-bis(mercaptomethyl)-1,3-propanedithiol, bis(2-mercaptoethyl)ether, ethylene glycol bis(2-mercaptoacetate), ethylene glycol bis(3-mercaptopropionate), 1,4-bis(3-mercaptobutyryloxy)butane, 1,4-butanediol-bis(3-mercaptopropionate), 1,4-butanediol-bis(thioglycolate), 1,6-hexanediol-bis(thioglycolate), tetraethylene glycol bis(3-mercaptopropionate), trimethylolpropane tris(2-mercaptoacetate), trimethylolpropane tris(3-mercaptopropionate), trimethylolethane tris(3-mercaptobutyrate), trimethylolpropane tris(3-mercaptobutyrate), pentaerythritol tetrakis(2-mercaptoacetate), pentaerythritol tetrakis(3-mercaptopropionate), 1,2-bis(2-mercaptoethylthio)-3-mercaptopropane, dipentaerythritol hexakis(3-mercaptopropionate), pentaerythritol tetrakis(3-mercaptobutyrate), 1,4-bis(3-mercaptobutyryloxy)butane, trimethylolpropane tris(3-mercaptobutyrate), trimethylolethane tris(3-mercaptobutyrate), 1,2-bis[(2-mercaptoethyl)thio]-3-mercaptopropane, 2-meraptomethyl-1,3-propanedithiol, 2-mercaptomethyl-1,4-butanedithiol, 2,4,5-tris(mercaptomethyl)-1,3-dithiolane, 2,2-bis(mercaptomethyl)-1,4-butanedithiol, 4,4-bis(mercaptomethyl)-3,5-dithiaheptane-1,7-dithiol, 2,3-bis(mercaptomethyl)-1,4-butanedithiol, 2,6-bis(mercaptomethyl)-3,5-dithiaheptane-1,7-dithiol, 4-mercaptomethyl-1,8-dimercapto-3,6-dithiaoctane, 2,5-bismercaptomethyl-1,4-dithiane, 1,1,3,3-tetrakis(mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, and 4-mercaptomethyl-1,8-dimercapto-3,6-dithiaoctane.

Examples of an aromatic polythiol include 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethoxy)benzene, 1,3-bis(mercaptomethoxy)benzene, 1,4-bis(mercaptomethoxy)benzene, 1,2-bis(mercaptoethoxy)benzene, 1,3-bis(mercaptoethoxy)benzene, 1,4-bis(mercaptoethoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethoxy)benzene, 1,2,4-tris(mercaptomethoxy)benzene, 1,3,5-tris(mercaptomethoxy)benzene, 1,2,3-tris(mercaptoethoxy)benzene, 1,2,4-tris(mercaptoethoxy)benzene, 1,3,5-tris(mercaptoethoxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptoethyl)benzene, 1,2,3,5-tetrakis(mercaptomethoxy)benzene, 1,2,4,5-tetrakis(mercaptomethoxy)benzene, 1,2,3,4-tetrakis(mercaptoethoxy)benzene, 1,2,3,5-tetrakis(mercaptoethoxy)benzene, 1,2,4,5-tetrakis(mercaptoethoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracene dimethanethiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane, and 1,4-bis(mercaptopropylthiomethyl)benzene.

Examples of a halogen-substituted aromatic polythiol include 2,5-dichlorobenzene-1,3-dithiol, 1,3-di(p-chlorophenyl)propane-2,2-dithiol, 3,4,5-tribromo-1,2-dimercaptobenzene, and 2,3,4,6-tetrachloro-1,5-bis(mercaptomethyl) benzene.

Examples of a heterocycle-containing polythiol include 2-methylamino-4,6-dithiol-sym-triazine, 2-ethylamino-4,6-dithiol-sym-triazine, 2-amino-4,6-dithiol-sym-triazine, 2-morpholino-4,6-dithiol-sym-triazine, 2-cyclohexylamino-4,6-dithiol-sym-triazine, 2-methoxy-4,6-dithiol-sym-triazine, 2-phenoxy-4,6-dithiol-sym-triazine, 2-thiobenzeneoxy-4,6-dithiol-sym-triazine, 2-thiobutyloxy-4,6-dithiol-sym-triazine, and 1,3,5-tris(3-mercaptobutyryloxyethyl)-1,3,5-triazine-2,4,6(1H,3H,5H)-trione.

Examples of an aromatic polythiol containing a sulfur atom in addition to a mercapto group include 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis(mercaptoethylthio)benzene, and nucleus alkylated products of the aforementioned polythiols.

Examples of an aliphatic polythiol containing a sulfur atom in addition to a mercapto group include bis(mercaptomethyl)sulfide, bis(mercaptoethyl)sulfide, bis(mercaptopropyl)sulfide, bis(mercaptomethylthio)methane, bis(2-mercaptoethylthio)methane, bis(3-mercaptopropyl)methane, 1,2-bis(mercaptomethylthio)ethane, 1,2-(2-mercaptoethylthio)ethane, 1,2-(3-mercaptopropyl)ethane, 1,3-bis(mercaptomethylthio)propane, 1,3-bis(2-mercaptoethylthio)propane, 1,3-bis(3-mercaptopropylthio)propane, 1,2-bis(2-mercaptoethylthio)-3-mercaptopropane, 2-mercaptoethylthio-1,3-propanedithiol, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, bis (mercaptomethyl)disulfide, bis(mercaptoethyl)disulfide, and bis(mercaptopropyl)disulfide.

Examples of thioglycolic acid or mercaptopropionic acid esters of the aforementioned compounds include hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), 1,4-dithiane-2,5-diol bis(2-mercaptoacetate), 1,4-dithiane-2,5-diol bis(3-mercaptopropionate), 2,5-bis (mercaptomethyl)-1,4-dithiane, 2,5-bis(2-mercaptoethyl)-1,4-dithiane, 2,5-bis(3-mercaptopropyl)-1,4-dithiane, 2-(2-mercaptoethyl)-5-mercaptomethyl-1,4-dithiane, 2-(2-mercaptoethyl)-5-(3-mercaptopropyl)-1,4-dithiane, 2-mercaptomethyl-5-(3-mercaptopropyl)-1,4-dithiane, thioglycolic acid bis(2-mercaptoethyl ester), thiodipropionic acid bis(2-mercaptoethyl ester), 4,4'-thiodibutyric acid bis (2-mercaptoethyl ester), dithiodiglycolic acid bis(2-mercaptoethy ester), dithiodipropionic acid bis(2-mercaptoethyl ester), 4,4'-dithiodibutyric acid bis(2-mercaptoethyl ester), thiodiglycolic acid bis(2,3-dimercaptopropyl ester), thiodipropionic acid bis(2,3-dimercaptopropyl ester), dithiodiglycolic acid bis(2,3-dimercaptopropyl ester), and dithiodipropionic acid (2,3-dimercaptopropyl ester).

Examples of a heterocycle-containing polythiol containing a sulfur atom in addition to a mercapto group include 3,4-thiophenedithiol, tetrahydrothiophene-2,5-dimercaptomethyl, and 2,5-dimercapto-1,3,4-thiadiazole.

Examples of a polythiol containing an isocyanurate group include 1,2-bis[(2-mercaptoethyl)thio]-3-mercaptopropane, tris-{(3-mercaptopropionyloxy)-ethyl}-isocyanurate, 1,3,5-tris(3-mercaptobutyryloxyethyl)-1,3,5-triazine-2,4,6(1H, 3H, 5H)-trione, and tris-[(3-mercaptopropionyloxy)-ethyl]-isocyanurate.

(B3-3) Polyamine:

The polyamine is a compound having at least two $NH_2$ groups in one molecule thereof, and examples thereof include the following compounds. Specifically, examples thereof include ethylenediamine, hexamethylenediamine, isophoronediamine, nonamethylenediamine, undecamethylenediamine, dodecamethylenediamine, metaxylenediamine, 1,3-propanediamine, putrescine, 2-(2-aminoethylamino) ethanol, diethylenetriamine, p-phenylenediamine, m-phenylenediamine, melamine, and 1,3,5-benzenetriamine.

(B3-4) Polyisocyanate:

The polyisocyanate is a compound having at least two NCO groups in one molecule thereof, and examples thereof include the following compounds.

Examples of an aliphatic isocyanate include ethylene diisocyanate, trimethylene diisocyanate, tetramethylene diisocyanate, hexamethylene diisocyanate, octamethylene diisocyanate, nanomethylene diisocyanate, 2,2'-dimethylpentane diisocyanate, 2,2,4-trimethylhexamethylene diisocyanate, decamethylene diisocyanate, butene diisocyanate, 1,3-butadiene-1,4-diisocyanate, 2,4,4-trimethylhexamethylene diisocyanate, 1,6,11-undecatriisocyanate, 1,3,6-hexamethylene triisocyanate, 1,8-diisocyanato-4-isocyanatomethyloctane, 2,5,7-trimethyl-1,8-diisocyanato-5-isocyanatomethyloctane, bis(isocyanatoethyl)carbonate, bis(isocyanatoethyl)ether, 1,4-butylene glycol dipropyl ether-ω,ω'-diisocyanate, lysine diisocyanatomethyl ester, lysine triisocyanate, 2-isocyanatoethyl-2,6-diisocyanatohexanoate, and 2-isocyanatopropyl-2,6-diisocyanatohexanoate.

Examples of an alicyclic isocyanate include isophorone diisocyanate, norbornane diisocyanate, bis(isocyanatomethyl)cyclohexane, dicyclohexylmethane diisocyanate, cyclohexane diisocyanate, methylcyclohexane diisocyanate, dicyclohexyldimethylmethane diisocyanate, 2,2'-dimethyldicyclohexylmethane diisocyanate, bis(4-isocyanato-n-butylidene)pentaerythritol, dimeric acid diisocyanate, 2-isocyanatomethyl-3-(3-isocyanatopropyl)-5-isocyanatomethyl-bicyclo[2,2,1]-heptane, 2-isocyanatomethyl-3-(3-isocyanatopropyl)-6-isocyanatomethyl-bicyclo [2,2,1]-heptane, 2-isocyanatomethyl-2-(3-isocyanatopropyl)-5-isocyanatomethyl-bicyclo[2,2,1]-heptane, 2-isocyanatomethyl-2-(3-isocyanatopropyl)-6-isocyanatomethyl-bicyclo[2,2,1]-heptane, 2-isocyanatomethyl-3-(3-isocyanatopropyl)-6-(2-isocyanatoethyl)-bicyclo[2,2,1]-heptane, 2-isocyanatomethyl-3-(3- isocyanatopropyl)-6-(2-isocyanatoethyl)-bicyclo[2,1,1]-heptane, 2-isocyanatomethyl-2-(3-isocyanatopropyl)-5-(2-isocyanatoethyl)-bicyclo[2,2,1]-heptane, 2-isocyanatomethyl-2-(3-isocyanatopropyl)-6-(2-isocyanatoethyl)-bicyclo[2,2,1]-heptane, and 1,3,5-tris(isocyanatomethyl)cyclohexane.

Examples of an aromatic isocyanate include xylylene diisocyanate, bis(isocyanatoethyl)benzene, bis(isocyanatopropyl)benzene, α,α,α',α'-tetramethylxylylene diisocyanate, bis(isocyanatobutyl)benzene, bis(isocyanatomethyl) naphthalene, bis(isocyanatomethyl)diphenyl ether, bis(isocyanatoethyl)phthalate, mesitylene triisocyanate, 2,6-di(isocyanatomethyl)furan, phenylene diisocyanate, tolylene diisocyanate, ethyl phenylene diisocyanate, isopropyl phenylene diisocyanate, dimethyl phenylene diisocyanate, diethyl phenylene diisocyanate, diisopropyl phenylene diisocyanate, trimethylbenzene triisocyanate, benzene triisocyanate, naphthalene diisocyanate, methyl naphthalene diisocyanate, biphenyl diisocyanate, tolidine diisocyanate, 4,4'-diphenylmethane diisocyanate, 3,3'-dimethyldiphenylmethane-4,4'-diisocyanate, bibenzyl-4,4'-diisocyanate, bis(isocyanatophenyl)ethylene, 3,3'-dimethoxybiphenyl-4,4'-diisocyanate, triphenylmethane triisocyanate, polymeric MDI, naphthalene triisocyanate, diphenylmethane-2,4,4'-triisocyanate, 3-methyldiphenylmethane-4,6,4'-triisocyanate, 4-methyl-diphenylmethane-3,5,2',4',6'-pentaisocyanate, phenyl isocyanatomethyl isocyanate, phenyl isocyanatoethyl isocyanate, tetrahydronaphthylene diisocyanate, hexahydrobenzene diisocyanate, hexahydrodiphenylmethane-4,4'-diisocyanate, diphenyl ether diisocyanate, ethylene glycol diphenyl ether diisocyanate, 1,3-propylene glycol diphenyl ether diisocyanate, benzophenone diisocyanate, diethylene glycol diphenyl ether diisocyanate, dibenzofuran diisocyanate, carbazole diisocyanate, ethyl carbazole diisocyanate, and dichlorocarbazole diisocyanate.

Examples of a sulfur-containing aliphatic isocyanate include thiodiethyl diisocyanate, thiodipropyl diisocyanate, thiodihexyl diisocyanate, dimethyl sulfone diisocyanate, dithiodimethyl diisocyanate, dithiodiethyl diisocyanate, dithiodipropyl diisocyanate, dicyclohexylsulfide-4,4'-diisocyanate, 1-isocyanatomethylthio-2,3-bis(2-isocyanatoethylthio)propane, 1,2-bis(2-isocyanatoethylthio)ethane, 1,1,2,2-tetrakis(isocyanatomethylthio)ethane, 2,2,5,5-tetrakis(isocyanatomethylthio)-1,4-dithiane, 2,4-dithiapentane-1,3-diisocyanate, 2,4,6-trithiaheptane-3,5-diisocyanate, 2,4,7,9-tetrathiapentane-5,6-diisocyanate, and bis(isocyanatomethylthio)phenyl methane.

Examples of an aliphatic sulfide-based isocyanates include bis[2-(isocyanatomethylthio)ethyl]sulfide.

Examples of an aromatic sulfide-based isocyanate include diphenyl sulfide-2,4'-diisocyanate, diphenyl sulfide-4,4'-diisocyanate, 3,3'-dimethoxy-4,4'-diisocyanatodibenzyl thioether, bis(4-isocyanatomethylbenzene)sulfide, and 4,4'-methoxybenzenethioethylene glycol-3,3'-diisocyanate.

Examples of an aromatic disulfide-based isocyanate include diphenyl disulfide-4,4'-diisocyanate, 2,2'-dimethyl diphenyl disulfide-5,5'-diisocyanate, 3,3'-dimethyl diphenyl disulfide-5,5'-diisocyanate, 3,3'-dimethyl diphenyl disulfide-6,6'-diisocyanate, 4,4'-dimethyl diphenyl disulfide-5,5'-diisocyanate, 3,3'-dimethoxy diphenyl disulfide-4,4'-diisocyanate, and 4,4'-dimethoxy diphenyl disulfide-3,3'-diisocyanate.

Examples of an aromatic sulfone-based isocyanate include diphenyl sulfone-4,4'-diisocyanate, diphenyl sulfone-3,3'-diisocyanate, benzylidene sulfone-4,4'-diisocyanate, diphenylmethane sulfone-4,4'-diisocyanate, 4-methyldiphenylmethane sulfone-2,4'-diisocyanate, 4,4'-dimethoxydiphenyl sulfone-3,3'-diisocyanate, 3,3'-dimethoxy-4,4'-diisocyanatodibenzyl sulfone, 4,4'-dimethyldiphenyl sufone-3,3'-diisocyanate, 4,4'-di-tert-butyldiphenyl sulfone-3,3'-diisocyanate, 4,4'-dimethoxybenzene ethylene disulfone-3,3'-diisocyanate, and 4,4'-dichlorodiphenyl sulfone-3,3'-diisocyanate.

Examples of a sulfonic acid ester-based isocyanate include 4-methyl-3-isocyanatobenzene sulfonyl-4'-isocyanatophenol ester and 4-methoxy-3-isocyanatobenzene sulfonyl-4'-isocyanatophenol ester.

Examples of an aromatic sulfonic acid amide-based isocyanate include 4-methyl-3-isocyanatobenzene sulfonylanilide-3'-methyl-4'-isocyanate, dibenzene sulfonyl-ethylenediamine-4,4'-diisocyanate, 4,4'-dimethoxybenzene sulfonyl-ethylenediamine-3,3'-diisocyanate, and 4-methyl-3-isocyanatobenzene sulfonylanilide-4-methyl-3'-isocyanate.

Examples of a sulfur-containing heterocyclic isocyanate include thiophene-2,5-diisocyanate, thiophene-2,5-diisocyanatomethyl, 1,4-dithiane-2,5-diisocyanate, 1,4-dithiane-2,5-diisocyanatomethyl, 1,3-dithiolane-4,5-diisocyanate, 1,3-dithiolane-4,5-diisocyanatomethyl, 1,3-dithiolane-2-methyl-4,5-diisocyanatomethyl, 1,3-dithiolane-2,2-diisocyanatoethyl, tetrahydrothiophene-2,5-diisocyanate, tetrahydrothiophene-2,5-diisocyanatomethyl, tetrahydrothiophene-2,5-diisocyanatoethyl, and tetrahydrothiophene-3,4-diisocyanatomethyl.

Furthermore, a halogen substitute, an alkyl substitute, an alkoxy substitute, a nitro substitute, a polyhydric alcohol prepolymer type modified product, a carbodiimide modified product, a urea modified product, a biuret modified product, and a dimerization or trimerization reaction product of the aforementioned polyisocyanate can also be used.

(B3-5) Polyisothiocyanate:

The polyisothiocyanate is a compound having at least two NCS groups in one molecule thereof, and specific examples thereof are given below.

Examples of an aliphatic isothiocyanate include 1,2-diisothiocyanatoethane, 1,3-diisothiocyanatopropane, 1,4-diisothiocyanatobutane, 1,6-diisothiocyanatohexane, and p-phenylene diisopropylidene diisothiocyanate.

Examples of an alicyclic isothiocyanate include cyclohexyl isothiocyanate and cyclohexane diisothiocyanate.

Examples of an aromatic isothiocyanate include phenyl isothiocyanate, 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene diisocyanate, 4,4'-diisothiocyanato-1,1'-biphenyl, 1,1'-methylenebis(4-isothiocyanatobenzene), 1,1'-methylenebis(4-isothiocyanato-2-methylbenzene), 1,1'-methylenebis(4-isothiocyanato-3-methylbenzene), 1,1'-(1,2-ethanediyl)bis(4-isothiocyanatobenzene), 4,4'-diisothiocyanatobenzophenone, 4,4'-diisothiocyanato-3,3'-dimethyl benzophenone, benzanilide-3,4'-diisothiocyanate, diphenyl ether-4,4'-diisothiocyanate, and diphenylamine-4,4'-diisothiocyanate.

Examples of a heterocycle-containing isothiocyanate include 2,4,6-triisothiocyanato-1,3,5-triazine.

Examples of a carbonyl isothiocyanate include hexanedioyl diisothiocyanate, nonanedioyl diisothiocyanate, carbonic diisothiocyanate, 1,3-benzenedicarbonyl diisothiocyanate, 1,4-benzenedicarbonyl diisothiocyanate, and (2,2'-bipyridine)-4,4'-dicarbonyl diisothiocyanate.

Furthermore, a polyfunctional isothiocyanate having at least one sulfur atom in addition to the sulfur atom of an isothiocyanate group can also be used. Examples of such a polyfunctional isothiocyanate include the following compounds.

Examples of a sulfur-containing aliphatic isothiocyanate include thiobis(3-isothiocyanatopropane), thiobis(2-isothiocyanatoethane), and dithiobis(2-isothiocyanatoethane).

Examples of a sulfur-containing aromatic isothiocyanate include 1-isothiocyanato-4-{(2-isothiocyanato)sulfonyl}benzene, thiobis(4-isothiocyanatobenzene), sulfonyl bis(4-isothiocyanatobenzene), sulfinyl bis(4-isothiocyanatobenzene), dithiobis(4-isothiocyanatobenzene), 4-isothiocyanato-1-{(4-isothiocyanatophenyl)sulfonyl}-2-methoxy-benzene, 4-methyl-3-isothiocyanatobenzene sulfonyl-4'-isothiocyanatophenyl ester, and 4-methyl-3-isothiocyanatobenzene sulfonylanilide-3'-methyl-4'-isothiocyanate.

Examples of the sulfur-containing heterocycle-containing isothiocyanate include thiophene-2,5-diisothiocyanate and 1,4-dithiane-2,5-dithiocyanate.

The above urethane-based polymerizable compounds (B3) are each used in combination so as to form a urethane bond or a urea bond through polymerization.

(B4) Other Polymerizable Compounds:

In the present invention, besides the aforementioned polymerizable compounds (B1) to (B3), an episulfide-based polymerizable compound (B4-1) and a thietanyl-based polymerizable compound (B4-2) can be used for the purpose of improving a refractive index, and also, a monofunctional polymerizable compound (B4-3) (excluding the above-exemplified polymerizable compounds having one polymerizable group) can be used for the purpose of improving photochromic properties. Furthermore, a composite type polymerizable compound (B4-4) having different types of polymerizable groups in a molecule thereof can also be used.

(B4-1) Episulfide-Based Polymerizable Compound

This polymerizable monomer is a compound having at least two episulfide groups in a molecule thereof and is especially preferred in the case where an SH group is introduced as a polymerizable functional group into the side chain of the photochromic compound (A). Specifically, examples of the compound include the following compounds. Bis(1,2-epithioethyl)sulfide, bis(1,2-epithioethyl)disulfide, bis(2,3-epithiopropyl)sulfide, bis(2,3-epithiopropylthio)methane, bis(2,3-epithiopropyl)disulfide, bis(2,3-epithiopropyldithio)methane, bis(2,3-epithiopropyldithio)ethane, bis(6,7-epithio-3,4-dithiaheptyl)sulfide, bis(6,7-epithio-3,4-dithiaheptyl)disulfide, 1,4-dithiane-2,5-bis(2,3-epithiopropyldithiomethyl), 1,3-bis(2,3-epithiopropyldithiomethyl)benzene, 1,6-bis(2,3-epithiopropyldithiomethyl)-2-(2,3-epithiopropyldithioethylthio)-4-thiahexane, 1,2,3-tris(2,3-epithiopropyldithio)propane, 1,1,1,1-tetrakis(2,3-epithiopropyldithiomethyl)methane, 1,3-bis(2,3-epithiopropyldithio)-2-thiapropane, 1,4-bis(2,3-epithiopropyldithio)-2,3-dithiabutane, 1,1,1-tris(2,3-epithiopropyldithio)methane, 1,1,1-tris(2,3-epithiopropyldithiomethylthio)methane, 1,1,2,2-tetrakis(2,3-epithiopropyldithio)ethane, 1,1,2,2-tetrakis(2,3-epithiopropyldithiomethylthio)ethane, 1,1,3,3-tetrakis(2,3-epithiopropyldithio)propane, 1,1,3,3-tetrakis(2,3-epithiopropyldithiomethylthio)propane, 2-[1,1-bis(2,3-epithiopropyldithio)methyl]-1,3-dithietane, and 2-[1,1-bis(2,3-epithiopropyldithiomethylthio)methyl]-1,3-dithietane.

(B4-2) Thietanyl-Based Polymerizable Compound:

This polymerizable compound is a thietane compound which is effective in the case where an SH group is introduced as a polymerizable functional group into the side chain of the photochromic compound (A) and has at least two thietanyl groups in a molecule thereof. Some of such thietanyl-based polymerizable compounds have an episulfide group together with a plurality of thietanyl groups and are exemplified in the aforementioned paragraph for the episulfide-based polymerizable compound. Other thietanyl-based polymerizable compounds include a metal-containing thietane compound having a metal atom in a molecule thereof and a non-metal thietane compound not containing a metal.

Examples of the non-metal thietane compound include bis(3-thietanyl)disulfide, bis(3-thietanyl)sulfide, bis(3-thietanyl)trisulfide, bis(3-thietanyl)tetrasulfide, 1,4-bis(3-thietanyl)-1,3,4-trithiabutane, 1,5-bis(3-thietanyl)-1,2,4,5-tetrathiapentane, 1,6-bis(3-thietanyl)-1,3,4,6-tetrathiahexane, 1,6-bis(3-thietanyl)-1,3,5,6-tetrathiahexane, 1,7-bis(3-thietanyl)-1,2,4,5,7-pentathiaheptane, 1,7-bis(3-thietanylthio)-1,2,4,6,7-pentathiaheptane, 1,1-bis(3-thietanylthio)methane, 1,2-bis(3-thietanylthio)ethane, 1,2,3-tris(3-thietanylthio)propane, 1,8-bis(3-thietanylthio)-4-(3-thietanylthiomethyl)-3,6-dithiaoctane, 1,11-bis(3-thietanylthio)-4,8-bis(3-thietanylthiomethyl)-3,6,9-trithiaundecane, 1,11-bis(3-thietanylthio)-4,7-bis(3-thietanylthiomethyl)-3,6,9-trithiaundecane, 1,11-bis(3-thietanylthio)-5,7-bis(3-thietanylthiomethyl)-3,6,9-trithiaundecane, 2,5-bis(3-thietanylthiomethyl)-1,4-dithiane, 2,5-bis[[2-(3-thietanylthio)ethyl]thiomethyl]-1,4-dithiane, 2,5-bis(3-thietanylthiomethyl)-2,5-dimethyl-1,4-dithiane, bisthietanyl sulfide, bis(thietanylthio)methane-3-[<(thietanylthio)methylthio>methylthio]thietane, bisthietanyl disulfide, bisthietanyl trisulfide, bisthietanyl tetrasulfide, bisthietanyl pentasulfide, 1,4-bis(3-thietanyldithio)-2,3-dithiabutane, 1,1,1-tris(3-thietanyldithio)methane, 1,1,1-tris(3-thietanyldithiomethylthio)methane, 1,1,2,2-tetrakis(3-thietanyldithio)ethane, and 1,1,2,2-tetrakis(3-thietanyldithiomethylthio)ethane.

The metal-containing thietane compound contains the group 14 element, such as an Sn atom, an Si atom, a Ge atom, and a Pb atom; the group 4 element, such as a Zr atom and a Ti atom; the group 13 element, such as an Al atom; or the group 12 element, such as a Zn atom, as the metal atom in a molecule thereof. The following compounds are especially preferably used.

Examples of an alkylthio(thietanylthio)tin include methylthiotris(thietanylthio)tin, ethylthiotris(thietanylthio)tin, propylthiotris(thietanylthio)tin, and isopropylthiotris(thietanylthio)tin.

Examples of a bis(alkylthio)bis(thietanylthio)tin include bis(methylthio)bis(thietanylthio)tin, bis(ethylthio)bis(thietanylthio)tin, bis(propylthio)bis(thietanylthio)tin, and bis(isopropylthio)bis(thietanylthio)tin.

Examples of an alkylthio(alkylthio)bis(thietanylthio)tin include ethylthio(methylthio)bis(thietanylthio)tin, methylthio(propylthio)bis(thietanylthio)tin, isopropylthio(methylthio)bis(thietanylthio)tin, ethylthio(propylthio)bis(thietanylthio)tin, ethylthio(isopropylthio)bis(thietanylthio)tin, and isopropylthio(propylthio)bis(thietanylthio)tin.

Examples of a bis(thietanylthio) cyclic dithiotin compound include bis(thietanylthio)dithiastannetane, bis(thietanylthio)dithiastannolane, bis(thietanylthio)dithiastanninane, and bis(thietanylthio)trithiastannocane.

Examples of an alkyl(thietanylthio)tin compound include methyltris(thietanylthio)tin, dimethylbis(thietanylthio)tin, butyltris(thietanylthio)tin, and tetrakis(thietanylthio)tin.

Examples of a compound containing a metal other than tin include tetrakis(thietanylthio)germanium and tris(thietanylthio)bismuth.

(B4-3) Monofunctional Polymerizable Compound:

This polymerizable compound is a compound which has one OH group or SH group in a molecule thereof and is used in combination with the aforementioned polyol to enhance photochromic properties by adjusting a molecular weight or a crosslinking degree. Examples of such a monofunctional polymerizable compound include the following compounds. Polyethylene glycol monooleyl ether, polyethylene glycol monomethyl ether, polyoxyethylene lauryl ether, a polyoxyethylene alkyl ether, polyoxyethylene 2-ethylhexyl ether, polyoxyethylene tridecyl ether, polyoxyethylene cetyl ether, polyoxyethylene stearyl ether, and polyethylene glycol mono-4-octylphenyl ether.

(B4-4) Composite Type Polymerizable Compound:

This polymerizable compound has a plurality of different types of polymerizable groups in a molecule thereof, and various physical properties can be contemplated to be adjusted by using this polymerizable compound.

Examples of such a composite type polymerizable compound include the following compounds.

Examples of a radical polymerization/OH type polymerizable compound include 2-hydroxy methacrylate, 2-hydroxy acrylate, 2-hydroxypropyl acrylate, and hydroxypropyl methacrylate.

Examples of a radical polymerization/isocyanate type polymerizable compound include 2-isocyanatoethyl methacrylate and 2-isocyanatoethyl acrylate.

Examples of an OH/SH type polymerizable compound include 2-mercaptoethanol, 3-mercapto-1,2-propanediol, glycerin di(mercaptoacetate), 1-hydroxy-4-mercaptocyclohexane, 2,4-dimercaptophenol, 2-mercaptohydroquinone, 4-mercaptophenol, 1,3-dimercapto-2-propanol, 2,3-dimercapto-1-propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritol tris(thioglycolate), pentaerythritol pentakis(3-mercaptopropionate), hydroxymethyl-tris(mercaptoethylthiomethyl)methane, 1-hydroxyethylthio-3-mercaptoethylthiobenzene, 4-hydroxy-4'-mercaptodiphenyl sulfone, 2-(2-mercaptoethylthio)ethanol, dihydroxyethyl sulfide mono(3-mercaptopropionate), dimercaptoethane mono(salicylate), and hydroxyethylthiomethyl-tris(mercaptoethylthio)methane.

In the aforementioned polymerizable compounds (B1) to (B4), the polymerizable compound which is preferably used is the radical polymerizable compound (B1) or the urethane-based polymerizable compound (B3) in the kneading method; the radical polymerizable compound (B1) in the lamination method; or the urethane-based polymerizable compound (B3) in the binder method.

(C) Polymerization-Curing Accelerator:

Various polymerization-curing accelerators can be used in order to rapidly accelerate the polymerization and curing of the photochromic composition of the present invention according to the types of the aforementioned polymerizable compound (B) and the polymerizable functional group introduced into the side chain of the photochromic compound (A).

For example, in the case where the radical polymerizable compound (B1) is used, and the radical polymerizable functional group is introduced into the side chain of the photochromic compound (A), a polymerization initiator (C1) is used as the polymerization-curing accelerator.

In the case where a curable composition containing the epoxy-based polymerizable compound (B2), the episulfide-based polymerizable compound (B4-1), or the thietanyl-based polymerizable compound (B4-2) is used, and an epoxy group, an episulfide group, or a thietanyl group is introduced as a polymerizable functional group into the side chain of the photochromic compound (A), an epoxy curing agent (C2-1) and a cationic polymerization catalyst (C2-2) for undergoing ring-opening polymerization of an epoxy group are used as the polymerization-curing accelerator.

Furthermore, in the case where a urethane-based polymerizable compound (B3) or other polymerizable compound (B4) is used, and an OH group, an SH group, an $NH_2$ group, an NCO group, or an NCS group is introduced as a polymerizable functional group into the side chain of the photochromic compound (A), a urethane reaction catalyst (C3-1) or a condensation agent (C3-2) is used as the polymerization-curing accelerator.

(C1) Polymerization Initiator

The polymerization initiator includes a thermal polymerization initiator and a photopolymerization initiator, and specifically, examples thereof are given below.

As the thermal polymerization initiator, examples of a diacyl peroxide include benzoyl peroxide, p-chlorobenzoyl peroxide, decanoyl peroxide, lauroyl peroxide, and acetyl peroxide.

Examples of a peroxy ester include t-butylperoxy-2-ethyl hexanoate, t-butylperoxy neodecanoate, cumylperoxy neodecanoate, and t-butylperoxy benzoate.

Examples of a percarbonate include diisopropylperoxy dicarbonate and di-sec-butylperoxy dicarbonate.

Examples of an azo compound include azobisisobutyronitrile and 2,2'-azobis(2,4-dimethylvaleronitrile).

As the photopolymerization initiator, examples of an acetophenone-based compound include 1-phenyl-2-hydroxy-2-methylpropan-1-one, 1-hydroxycyclohexyl phenyl ketone and 1-(4-isopropylphenyl)-2-hydroxy-2-methylpropan-1-one.

Examples of an α-dicarbonyl-based compound include 1,2-diphenylethanedione and methylphenyl glycoxylate.

Examples of an acylphosphine oxide-based compounds include 2,6-dimethylbenzoyl diphenylphosphine oxide, 2,4,6-trimethylbenzoyl diphenylphosphine oxide, 2,4,6-trimethylbenzoyl diphenylphosphinic acid methyl ester, 2,6-dichlorobenzoyl diphenylphosphine oxide, 2,6-dimethoxybenzoyl diphenylphosphine oxide, and phenylbis(2,4,6-trimethylbenzoyl)phosphine oxide.

In the case where a photopolymerization initiator is used, a known polymerization-curing acceleration aid, such as a tertiary amine, can also be used in combination.

(C2-1) Epoxy Curing Agent:

Examples of an amine compound and salt thereof include 2-methylimidazole, 2-ethyl-4-methylimidazole, 1,8-diazabicyclo(5,4,0)-7-undecene, trimethylamine, benzyl dimethylamine, triethylamine, 2,4,6-tris(dimethylaminomethyl)phenol, and 2-(dimethylaminomethyl)phenol.

Examples of a quaternary ammonium salt include tetramethylammonium chloride, benzyltrimethylammonium bromide, and tetrabutylammonium bromide.

Examples of an organic phosphine compound include tetra-n-butylphosphonium benzotriazoleate and tetra-n-butylphosphonium-0,0-diethylphosphorodithioate.

Examples of a metal carboxylic acid salt include chromium(III) tricarboxylate and tin octylate.

Examples of an acetylacetone chelate compound include chromium acetylacetonate.

(C2-2) Cationic Polymerization Catalyst:

Examples of a Lewis acid-based catalyst include a $BF_3$-amine complex, $PF_5$, $BF_3$, $ASF_5$, and $SbF_5$.

Examples of a thermosetting cationic polymerization catalyst include a phosphonium salt, a quaternary ammonium salt, a sulfonium salt, a benzylammonium salt, a benzylpyridinium salt, a benzylsulfonium salt, a hydrazinium salt, a carboxylic acid ester, a sulfonic acid ester, and an amine imide.

Examples of an ultraviolet curable cationic polymerization catalyst include a diaryl iodonium hexafluorophosphate and hexafluoroantimonic acid bis(dodecylphenyl)iodonium.

(C3-1) Urethane Reaction Catalyst

This reaction catalyst is used to form a poly(thio)urethane bond through a reaction between a polyiso(thio)cyanate with a polyol or a polythiol.

Examples thereof are given below. Triethylenediamine, hexamethylenetetramine, N, N-dimethyloctylamine, N,N,N',N'-tetramethyl-1,6-diaminohexane, 4,4'-trimethylene bis (1-methylpiperidine), 1,8-diazabicyclo-(5,4,0)-7-undecene, dimethyltin dichloride, dimethyltin bis(isooctylthioglycolate), dibutyltin dichloride, dibutyltin dilaurate, dibutyltin maleate, a dibutyltin maleate polymer, dibutyltin dilicinolate, dibutyltin bis(dodecylmercaptide), dibutyltin bis(isooctyl thioglycolate), dioctyltin dichloride, dioctyltin maleate, a dioctyltin maleate polymer, dioctyltin bis(butyl maleate), dioctyltin dilaurate, dioctyltin dilicinolate, dioctyltin dioleate, dioctyltin di(6-hydroxy)caproate, dioctyltin bis(isooctyl thioglycolate), and didodecyltin dilicinolate. Besides, various metal salts, such as copper oleate, copper acetylacetonate, iron acetylacetonate, iron naphthenate, iron lactate, iron citrate, iron gluconate, potassium octanoate, and 2-ethylhexyl titanate are also included.

(C3-2) Condensation Agent:

Examples of an inorganic acid include hydrogen chloride, hydrogen bromide, sulfuric acid, and phosphoric acid.

Examples of an organic acid include p-toluenesulfonic acid and camphorsulfonic acid.

Examples of an acidic ion exchange resin include a compound obtained by introducing a sulfonate group into a styrene-divinylbenzene copolymer.

Examples of a carbodiimide include dicyclohexyl carbodiimide and 1-ethyl-3-(3-dimethylaminopyrrolyl)-carbodiimide.

(Blending Amount of Polymerization-Curing Accelerator (C))

The aforementioned various polymerization-curing accelerators (C) can be used alone or in combination of two or more, and its amount may be so-called "catalytic amount". For example, the amount of the polymerization-curing accelerator may be a small amount in a range of 0.001 to 10 parts by mass, and especially 0.01 to 5 parts by mass based on 100 parts by mass of the polymerizable compound (B).

Other Compounding Components in Curable Composition:

So long as the effects of the present invention are not impaired, the curable composition of the present invention can be blended with various compounding agents known per se, for example, various stabilizers, such as a release agent, an ultraviolet absorbent, an infrared absorbent, an ultraviolet stabilizer, an antioxidant, a coloring inhibitor, an antistatic agent, a fluorescent dye, a dye, a pigment, and a flavoring agent, an additive, a solvent, a leveling agent, and a polymerization control agent, such as a thiol exemplified by t-dodecyl mercaptan, as required.

Above all, when an ultraviolet stabilizer is used, it can improve durability of the photochromic moiety, and hence, such is preferred. As the ultraviolet stabilizer, there are known a hindered amine photostabilizer, a hindered phenol antioxidant, and a sulfur-based antioxidant. Especially preferred ultraviolet stabilizers are given below. Bis(1,2,2,6,6-pentamethyl-4-piperidyl)sebacate, ADK STAB LA-52, LA-57, LA-62, LA-63, LA-67, LA-77, LA-82, and LA-87, all of which are manufactured by Adeka Corporation; 2,6-di-tert-butyl-4-methyl-phenol, ethylenebis(oxyethylene) bis [3-(5-tert-butyl-4-hydroxy-m-tolyl)propionate]; and IRGANOX 1010, 1035, 1075, 1098, 1135, 1141, 1222, 1330, 1425, 1520, 259, 3114, 3790, 5057, and 565, all of which are manufactured by Ciba Specialty Chemicals Inc.

Although the amount of the ultraviolet stabilizer is not particularly limited so long as the effects of the present invention are not impaired, it is in a range of typically 0.001 to 10 parts by mass, and especially 0.01 to 1 part by mass based on 100 parts by mass of the photochromic compound. In particular, in the case where a hindered amine photostabilizer is used, it is recommended to use the stabilizer in an amount of preferably 0.5 to 30 mol, more preferably 1 to 20 mol, and still more preferably 2 to 15 mol per mol of the photochromic moiety in order to prevent the color drift of adjusted developed color tone as a result that the effect of improving durability differs according to the type of the photochromic moiety.

A photochromic compound other than the photochromic compound (A) of the present invention can also be used so long as the effects of the present invention are not impaired.

<Preferred Composition of Curable Composition>

In particular, in the case where the photochromic compound of the present invention has a polymerizable group, a photochromic cured body can be obtained by polymerizing it alone.

The photochromic compound (A) can also be used in combination with the polymerizable compound (B).

In either case, the mass corresponding to the photochromic moiety is preferably set to 0.001 to 10% by mass based on 100% by mass of the total amount of the curable composition in order to obtain a sufficiently high optical color density.

The mass corresponding to the photochromic moiety varies with the revealing system of photochromic properties. For example, in the case of revealing photochromic properties by the kneading method, the foregoing mass is preferably 0.001 to 2% by mass, and especially preferably 0.001 to 1% by mass, and in the case of revealing photochromic properties by the lamination method and the binder method, the foregoing mass is preferably 0.1 to 10% by mass, and especially preferably 1 to 7% by mass.

A blending ratio of the photochromic compound (A) and the polymerizable compound (B) varies with the number of groups (side chains) having a photochromic moiety contained in one molecule of the photochromic compound.

In the case where the number of groups (side chains) of the photochromic moiety contained in one molecule is 1 to 9, it is preferred to blend the photochromic compound (A) in an amount of 0.5 to 80% by mass and the polymerizable compound (B) in an amount of 20 to 99.5% by mass; and in the case where the number of groups (side chains) of the photochromic moiety contained in one molecule is 2 to 16, it is preferred to blend the photochromic compound (A) in an amount of 0.1 to 50% by mass and the polymerizable compound (B) in an amount of 50 to 99.9% by mass.

Furthermore, in the present invention, in order to exhibit the effect for improving the photochromic properties by the photochromic compound (A) to the maximum extent, the foregoing blending ratio may be appropriately determined according to the type of the photochromic compound (A) and the type of the polymerizable compound (B) to be used.

In the case where the polymerizable functional group to be introduced into the long-chain group or short-chain group, preferably the long-chain group of the photochromic compound (A) is an acrylic group and/or a methacrylic group, it is optimum to use the radical polymerizable compound (B1) in combination as the polymerizable compound (B).

On that occasion, as for the blending proportion of the component (B1), taking into consideration the hardness, mechanical characteristics, and photochromic properties, such as a color optical density and a fading speed, of the obtained photochromic cured body, when the total amount of the component (B1-1), the component (B1-2), the compound (B1-3), and the component (B1-4) is defined as 100% by mass, it is preferred to set the amount of the component (B1-1) to 80 to 100% by mass and the sum total of the component (B1-2), the compound (B1-3), and the component (B1-4) to 0 to 20% by mass. Furthermore, when the total amount of the components (B1-1) is defined as 100% by mass, it is preferred to set the amount of the component (B1-1-1) to 30 to 80% by mass, the amount of the component (B1-1-2) to 10 to 50% by mass, and the amount of the component (B1-1-3) to 0 to 20% by mass, respectively.

In the case where the polymerizable functional group to be introduced into the long-chain group or short-chain group, preferably the long-chain group of the photochromic compound (A) is an OH group and/or an SH group, it is optimum to use a polyol (B3-1), a polythiol (B3-2), a polyamine (B3-3), a polyisocyanate (B3-4), and a polyisothiacyanate (B3-5) in combination so as to form a urethane bond, a thiourethane bond, a urea bond, or a thiourea bond (especially, a urethane bond or a thiourethane bond).

In this case, it is recommended to set the amounts of the SH group and the OH group to a range of 0.8 to 1.2 mol, especially preferably 0.85 to 1.15 mol, and most preferably 0.9 to 1.1 mol per mol of the NCO group or the NCS group.

<Use of Curable Composition>

As for the curable composition of the present invention, in the case where a chain having a polymerizable group is introduced into the photochromic compound (A), even only the photochromic compound (A) can be used. For example, a photochromic sheet (photochromic cured body) can be fabricated by molding the photochromic compound (A) in a sheet.

A coating solution is prepared by dispersing or dissolving the aforementioned curable composition in an organic solvent, and this coating solution is applied onto a transparent optical sheet or optical film, which is then dried to form a photochromic coating layer (photochromic cured body), thereby making it possible to reveal photochromic properties.

In general, the curable composition of the present invention is preferably a blend of the polymerizable compound (B) or the polymerization-curing accelerator (C) in addition to the photochromic compound (A). For example, it is desired that a photochromic composition is prepared by melt kneading the respective components and polymerized and cured to fabricate a photochromic cured body, thereby revealing the photochromic properties by this cured body. While an example of forming a curable composition containing the polymerizable compound (B) into a photochromic cured body is explained below, even in the case where only the photochromic compound (A) into which a chain having a polymerizable group has been introduced is used, the same method as that for curing the curable composition can be employed. In addition, the photochromic compound (A) contained in the curable composition may have or may not have a polymerizable group.

Polymerization and curing for fabricating a photochromic cured body are performed by conducting radical polymerization, ring-opening polymerization, anionic polymerization, or condensation polymerization by irradiating an active energy ray, such as ultraviolet rays, α-rays, ß-rays, and γ-rays, or heating or using both of them. That is, the polymerization means may be appropriately adopted according to the type of the polymerizable compound (B) or the polymerization-curing accelerator (C) and the shape of the photochromic cured body to be formed.

On the occasion of thermally polymerizing the curable composition of the present invention having the polymerizable compound (B) and so on blended therein, in particular, the temperature affects the properties of the obtained photochromic cured body. This temperature condition is affected by the type and amount of the thermal polymerization initiator and the type of the polymerizable compound, and therefore, it cannot be unequivocally limited. However, in general, a process in which the polymerization is started at a relatively low temperature, and then, the temperature is slowly raised is preferred. The polymerization time varies with various factors like the temperature, and therefore, it is preferred to previously determine the optimum time according to these conditions. However, in general, it is preferred to choose conditions under which the polymerization is completed within 2 to 48 hours. In the case of obtaining a photochromic laminated sheet, it is preferred to conduct the polymerization at a temperature at which a reaction between polymerizable functional groups proceeds. On that occasion, it is preferred to determine the optimum temperature and the optimum time so as to obtain a target molecular weight.

On the occasion of optically polymerizing the curable composition of the present invention, among polymerization conditions, in particular, the UV intensity affects the properties of the obtained photochromic cured body. This illuminance condition is affected by the type and amount of the photopolymerization initiator and the types of the polymerizable monomers, and therefore, it cannot be unequivocally limited. However, in general, it is preferred to choose the condition such that a UV light of 50 to 500 mW/cm$^2$ at a wavelength of 365 nm is irradiated for 0.5 to 5 minutes.

In the case of revealing the photochromic properties by the kneading method using the aforementioned polymerization and curing, the curable composition is injected into a space formed by a glass mold held by an elastomer gasket or a spacer and cast polymerized by heating in an air furnace or irradiating an active energy ray, such as ultraviolet rays, according to the types of the polymerizable compound (B) and the polymerization-curing accelerator, thereby making it possible to obtain a photochromic cured body which has been molded into an optical material, such as a lens.

According to such a method, a spectacle lens or the like, which is given photochromic properties, is directly obtained.

In the case of revealing the photochromic properties by the lamination method, a coating solution is prepared by appropriately dissolving the curable composition in an organic solvent, applied onto the surface of an optical substrate, such as a lens substrate, through spin coating, dipping, or the like, and then dried to remove the organic solvent, and subsequently, polymerization and curing are conducted through UV irradiation, heating, or the like in an inert gas, such as nitrogen, thereby forming a photochromic layer composed of a photochromic cured body on the surface of the optical substrate (coating method).

The photochromic layer composed of a photochromic cured body can also be formed on the surface of the optical substrate through inner-mold cast polymerization in which an optical substrate, such as a lens substrate, is arranged opposed to a glass mold in such a manner that a predetermined space is formed therebetween, and the curable composition is injected into this space, to conduct polymerization-curing through UV irradiation, heating, or the like in this state (cast polymerization method).

In the case of forming the photochromic layer on the surface of the optical substrate by the aforementioned lamination method (coating method and cast polymerization method), adhesion between the photochromic layer and the optical substrate can be enhanced by subjecting the surface of the optical substrate to a chemical treatment with an alkaline solution, an acidic solution, or the like, or a physical treatment by corona discharge, plasma discharge, polishing, or the like in advance. As a matter of course, it is possible to provide a transparent adhesive resin layer on the surface of the optical substrate.

Furthermore, in the case of revealing the photochromic properties by the binder method, sheet molding is conducted by using the curable composition to form a photochromic sheet, which is then sandwiched between two transparent sheets (optical sheets) and subjected to the aforementioned polymerization-curing, thereby obtaining a photochromic laminate in which a photochromic layer serves as an adhesive layer.

In this case, the photochromic sheet can also be formed by adopting a measure, such as coating using a coating solution prepared by dissolving the curable composition in an organic solvent.

The thus-fabricated photochromic laminate is, for example, set in a mold, and then, a thermoplastic resin (for example, a polycarbonate) for optical substrate, such as a lens, is injection molded to obtain an optical substrate, such as a lens having a predetermined shape and provided with photochromic properties. In addition, this photochromic laminate can also be bonded to the surface of an optical substrate with an adhesive or the like. There can also be thus obtained a photochromic lens.

In the case of fabricating the photochromic laminate as mentioned above, in particular, from the standpoint that the adhesion to the optical substrate is high, it is preferred that a urethane- or urea-based polymerizable compound (B3), especially a urethane-based polymerizable compound is used as the polymerizable compound (B) and adjusted so as to form polyurethane.

The aforementioned curable composition of the present invention can reveal excellent photochromic properties, such as a color optical density and a fading speed, and is effectively used in the fabrication of an optical substrate provided with photochromic properties, for example, a photochromic lens, without deteriorating characteristics, such as mechanical strength.

According to use purpose, it is possible to subject the photochromic layer or the photochromic cured body formed from the curable composition of the present invention to a post-treatment, such as dying with a dye, such as a dispersion dye, fabrication of a hard coat film by using a silane coupling agent or a hard coating agent composed of a sol of silicon, zirconium, antimony, aluminum, tin, or tungsten as a main component, formation of a thin film through vapor deposition of a metal oxide, such as $SiO_2$, $TiO_2$, and $ZrO_2$, an antireflection treatment with a thin film formed by applying an organic polymer, or an antistatic treatment.

EXAMPLES

The present invention is hereunder described in detail by reference to Examples and Comparative Examples, but it should be construed that the present invention is not limited to these Examples. Measuring instruments used in the present invention and the method of producing each of components, and so on are first described.

(Measurement of Molecular Weight; Gel Permeation Chromatography (GPC Measurement))

A liquid chromatograph (manufactured by Nihon Waters K.K.) was used as an apparatus for GPC measurement. The Shodex GPC KF-802 (elimination limit molecule quantity: 5,000), KF802.5 (elimination limit molecule quantity: 20,000), KF-803 (elimination limit molecule quantity: 70,000), KF-804 (elimination limit molecule quantity: 400,000), and KF-805 (elimination limit molecular quantity: 2,000,000), all of which are manufactured by Showa Denko K.K., were appropriately used as columns according to the molecular weight of a sample to be analyzed. In addition, dimethyl formamide (DMF) was used as a developing solution to conduct the measurement under a condition at a flow rate of 1 mL/min and a temperature of 40° C. Polystyrene was used as a reference standard to obtain a weight average molecular weight by means of comparative conversion. A differential refractometer was used as a detector.

Example 1

Synthesis of Cyclodextrin-Bonded Photochromic Compound (CyD1)

This CyD1 is a compound in the case of using cyclodextrin as a compound forming a polyvalent residue.

First Step 100 mL of toluene was added to 4.7 g (10 mmol) of a compound represented by the following formula (11):

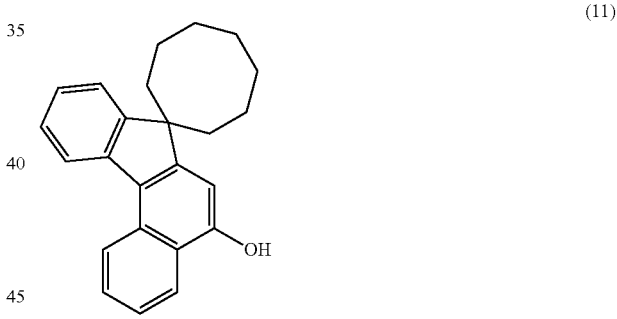

(11)

5.3 g (15 mmol) of a compound represented by the following formula (12) and synthesized according to a method described in WO 2006/022825 A:

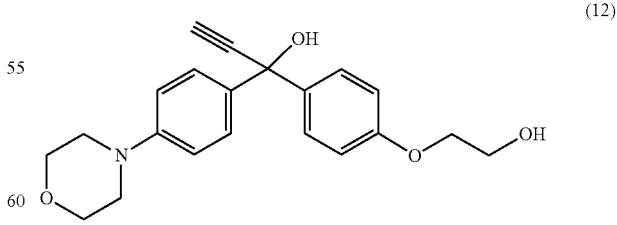

(12)

and 0.25 g (1 mmol) of pyridinium p-toluenesulfonate and heated with stirring at 75° C. for 1 hour. After cooling to room temperature, the resultant was washed thrice with 100 mL of water, and an organic layer was distilled off under reduced pressure. The obtained residue was purified by means of silica gel column chromatography, to obtain 6.2 g of a compound represented by the following formula (13).

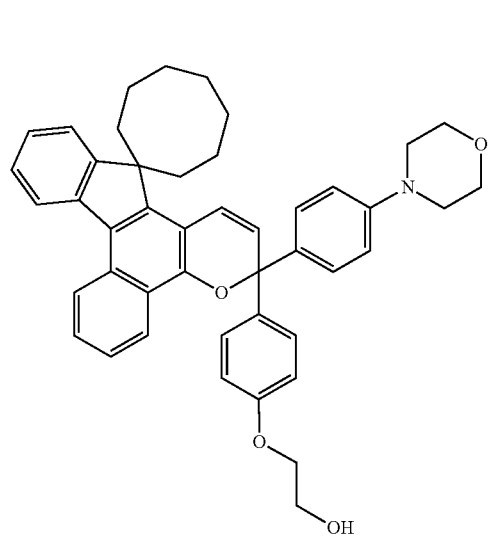

(13)

The yield was 77%.

Second Step 200 mL of dichloromethane was added to 6.2 g (7.7 mmol) of the compound represented by the aforementioned formula (13), 1.55 g (15.5 mmol) of succinic anhydride, and 1.95 g (19.3 mmol) of triethylamine and stirred at room temperature for 12 hours. After cooling with ice, 10% hydrochloric acid was slowly added until the pH reached 1, to conduct liquid separation. The resultant was washed thrice with 250 mL of water, and an organic layer was distilled off under reduced pressure. The obtained residue was purified by means of silica gel chromatography, to obtain 6.6 g (7.3 mmol) of a compound represented by the following formula (14).

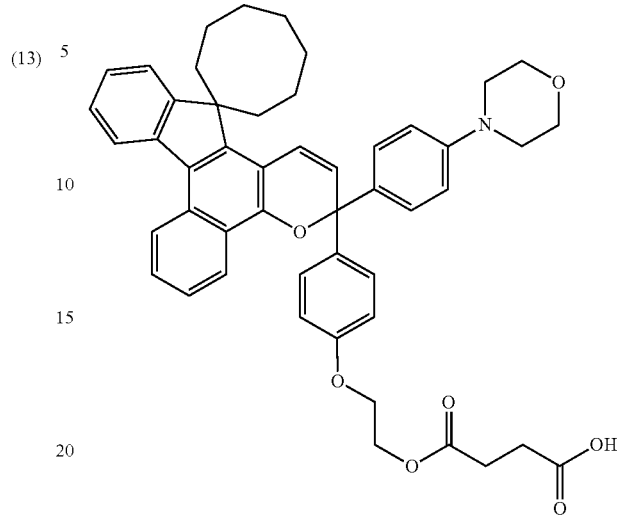

(14)

The yield was 95%.

Third Step

To 96 mg (0.1 mmol) of the compound represented by the aforementioned formula (14) and 118 mg (0.1 mmol) of commercially available 2-hydroxypropyl-α-cyclodextrin, 18 mL of THF (tetrahydrofuran)/DMSO (dimethyl sulfoxide) (1/1, v/v) was added and stirred. Thereafter, 192 mg of WSC (water-soluble carbodiimide) and 63 mg of DMAP (dimethylaminopyridine) were added and stirred for 12 hours under a shading condition. After confirming vanishing of the raw materials by means of TLC (thin layer chromatography), water was added to terminate the reaction. After extracting with ethyl acetate, the residue was concentrated with an evaporator and subjected to reslurry with 10 mL of acetone, to obtain a photochromic compound represented by the following formula (15) and having a group (side chain) containing a photochromic moiety (yield: 53 mg).

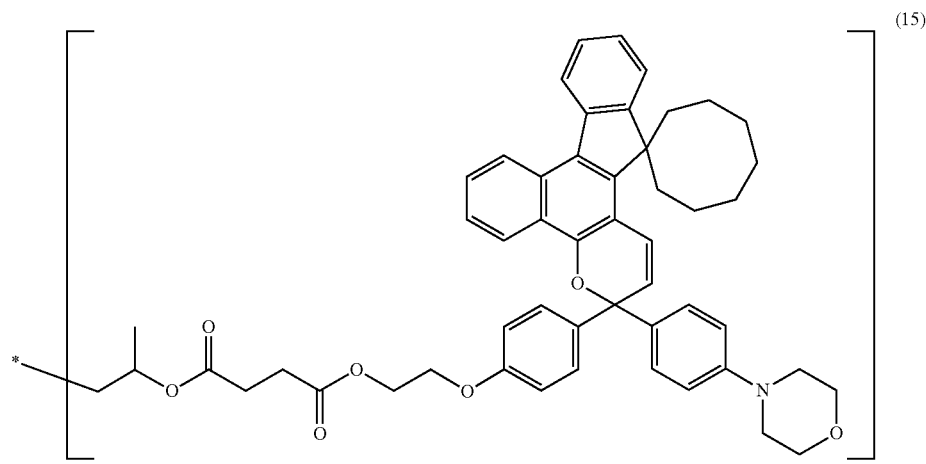

(15)

According to ¹H-NMR, it was confirmed that the photochromic moiety represented by the aforementioned formula (15) in the number of 1.8 was introduced into the α-cyclodextrin.

Subsequently, 28 mg of the above-obtained photochromic compound represented by the formula (15), 77 mg of succinic anhydride, and 0.11 mL of triethylamine were dissolved in 5.0 mL of dichloromethane and stirred at room temperature for 14 hours. Thereafter, 138 mg of polypropylene glycol monobutyl ether (number average molecular weight: 1,000), 40 mg of WSC, and 10 mg of DMAP were added and stirred at room temperature for 12 hours under a shading condition. After distilling off the solvent under reduced pressure, the residue was purified by means of silica gel chromatography (developing solvent: acetone/ethyl acetate=5/95), to obtain 67 mg of a photochromic compound (CyD1) represented by the following formula (16) and having a polypropylene glycol monobutyl ether chain (long-chain group) introduced thereinto.

(16)

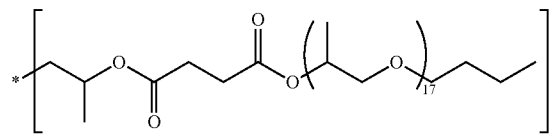

According to ¹H-NMR, it was confirmed that the long chain represented by the aforementioned formula (16) in the number of 9.3 was introduced into the α-cyclodextrin.

The characteristics of the obtained photochromic compound (CyD1) are given below. The following numerical values are an average value.
<Whole Valence of Polyvalent Residue>
  Cyclodextrin (compound forming a polyvalent residue) whole valence: 18
<Reactive Groups Remaining without being Reacted>
  Number of reactive groups remaining without being reacted in cyclodextrin: 6.9
<Groups Containing Photochromic Moiety>
  Number of groups containing photochromic moiety: 1.8
  Degree of modification of side chain containing photochromic moiety: 0.10 (10%)
  Number average molecular weight of side chain containing photochromic moiety: about 160 in average (excluding the photochromic moiety)
<Long-Chain Group>
  Number of long-chain groups: 9.3
  Degree of modification of long-chain group: 0.52 (52%)
  Number average molecular weight of long-chain groups: about 1,200 in average (the terminal is a butyl group)
<Number of Short-Chain Groups>
  Number of short-chain groups: 0
<Weight Average Molecular Weight of Photochromic Compound Itself>
  Weight average molecular weight Mw (GPC): 13,000

From these results, it was noted that the CyD1 has a structure in which the photochromic moiety was introduced into 10% of the hydroxy groups of the α-cyclodextrin, and polypropylene glycol monobutyl ether (long-chain) was introduced into 52% of the hydroxy groups of the α-cyclodextrin. In addition, from the measurement results of ¹H-NMR, it was noted that the side chain having a photochromic moiety in the number of about 1.8 in average and the long chain in the number of about 9.3 in average were introduced per molecule.

Example 2

Preparation of Curable Composition (hereinafter occasionally referred to simply as "(Y1)"), and Fabrication and Evaluation of Photochromic Cured Body
(Preparation of Curable Composition)

According to the following formulation, the respective components were thoroughly mixed to prepare a photochromic curable composition (Y1).
Formulation:
(A) Photochromic Compound
  CyD1 (produced in Example 1) 69.3 mg (photochromic dye: 9.6 μmol)
(B) Polymerizable Compound
  (B1-1-1-4) Norbornene methane diisocyanate: 4.58 g
  (B3-2) Pentaerythritol tetrakis(3-mercaptopropionate): 5.42 g
(C) Polymerization-Curing Accelerator
  (C3-1) Dimethyltin dichloride: 10 mg
(Fabrication and Evaluation of Photochromic Cured Body)

Using the aforementioned curable composition (Y1), a photochromic cured body was obtained by the kneading method. Since the polymerizable compounds (B) used in the curable composition (Y1) are norbornene methane diisocyanate and pentaerythritol tetrakis(3-mercaptopropionate), a matrix formed from these polymerizable compounds (B) has a narrow free space. Accordingly it is evident that so long as the photochromic characteristics can be exhibited in this matrix, more excellent photochromic characteristics are exhibited.

The method of the polymerization is described below.

After the aforementioned curable composition (Y1) was thoroughly defoamed, it was injected into a mold die composed of a 2 mm-thick casting mold constituted of glass molds having been subjected to a release treatment and a gasket made of an ethylene-vinyl acetate copolymer. Subsequently the composition was cured over 15 hours while gradually raising the temperature from 30° C. to 95° C. After completion of the polymerization, the photochromic cured body was removed from the glass molds of the casting mold.

The obtained photochromic cured body was used as a sample and exposed to light having a beam intensity at 365 nm of 2.4 mW/cm² on the surface of the polymer (photochromic coat layer) and at 245 nm of 24 μW/cm² with an L-2480 (300 W) SHL-100 xenon lamp, manufactured by Hamamatsu Photonics K.K. through an aero-mass filter (manufactured by Corning Incorporated) at 20±1° C. for 120 seconds, thereby developing a color and measuring photochromic characteristics of the photochromic laminate. Respective photochromic characteristics were evaluated by the following methods. The results are shown in Table 1.
•Maximum Absorption Wavelength (λmax):

This is a maximum absorption wavelength after color development determined by a spectrophotometer (instantaneous multi-channel photodetector MCPD1000), manufactured by Otsuka Electronics Co., Ltd. The maximum absorption wavelength is related to a color tone at the time of color development.
•Color Optical Density {ε(120)-ε(0)}:

Difference between absorbance {ε(120)} after 120 seconds of exposure to light at the aforementioned maximum absorption wavelength and absorbance ε(0) before exposure. It may be said that as this value becomes larger, the photochromic properties become more excellent.
•Fading Speed [t½ (sec)]:

Time elapsed until the absorbance at the aforementioned maximum absorption wavelength of a sample drops to ½ of {ε(120)-ε(0)} when exposure of light is continued for 120 seconds and then stopped. It may be said that as this time becomes shorter, the photochromic properties become more excellent.

Comparative Example 1

In place of the photochromic compound in Example 1, a photochromic compound (d1) composed of only a photochromic moiety and represented by the following formula (17) was synthesized according to the method described in WO 2006/022825 A.

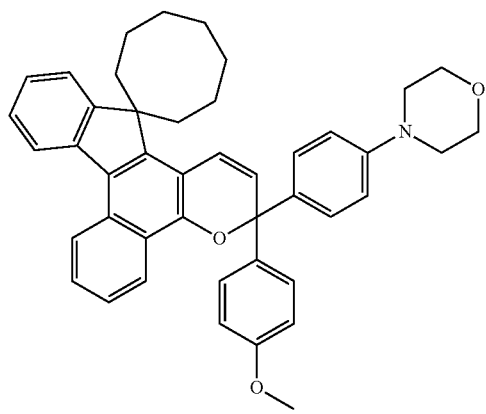

(17)

Using the obtained photochromic compound (d1), a curable composition (y1) containing the polymerizable compounds (B) and the polymerization-curing accelerator (C) of the same kinds and the same blending proportions as in Example 2 was produced such that the portion of the photochromic dye became 9.6 μmol. Using the obtained curable composition (y1), the same operations as in Example 2 were conducted, and the same evaluation was conducted. The results are shown in Table 1.

Comparative Example 2

In place of the photochromic compound in Example 1, a photochromic compound (d2) not containing a polyvalent residue, namely one in which the long-chain group and the photochromic moiety were directly bonded to each other, was synthesized.

4.14 g (5.0 mmol) of the compound represented by the aforementioned formula (13) was dissolved in dehydrated dichloromethane, to which were then added 11.0 g of a succinic acid adduct of a polypropylene glycol monobutyl ether (number average molecular weight: 2,000) represented by the following formula (18):

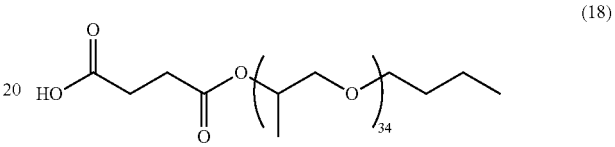

(18)

2.0 g of WSC and 120 mg of DMAP, followed by stirring at room temperature for 14 hours under a shading condition. After confirming vanishing of the raw materials by means of TLC, an organic layer was washed with water and distilled off with an evaporator under a reduced pressure. The residue was purified by means of silica gel chromatography (developing solvent: acetone/ethyl acetate=5/95), to obtain an oily material (yield: 78%) represented by the following formula (19).

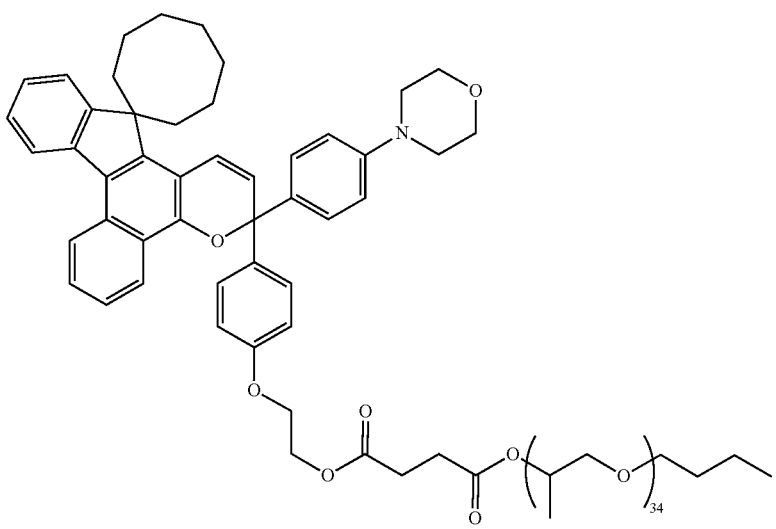

(19)

Using 30.7 mg of a long chain-bonded photochromic compound (d2) represented by the aforementioned formula (19), the same operations as in Comparative Example 1 were conducted to prepare a curable composition (y2) (hereinafter occasionally referred to simply as "(y2)"), from which was then fabricated and evaluated a photochromic cured body. The results are shown in Table 1.

TABLE 1

|  | Compound | Composition | λmax | Color optical density | Fading speed |
|---|---|---|---|---|---|
| Example 2 | CyD1 | Y1 | 565 nm | 0.60 | 92 sec |
| Comparative Example 1 | d1 | y1 | 565 nm | 0.01 | — |
| Comparative Example 2 | d2 | y2 | 565 nm | 0.29 | 260 sec |

In the obtained photochromic cured bodies, the compound d1 (Comparative Example 1) did not show the photochromic properties. This fact demonstrates that the foregoing thiourethane matrix is high in the crosslinking density and does not have a free space tolerable for revealing the photochromic properties of the compound d1.

Although the compound d2 (Comparative Example 2) in which the long chain was directly bonded to the compound d1 showed the photochromic properties, it brought about such results that the color optical density is thin, and the fading speed is slow. This demonstrates that the introduction of only the long chain is still insufficient for formation of a microphase-separated structure, and therefore, a free space necessary and sufficient for revealing favorable photochromic properties cannot be produced.

As is evident from Example 2 that is concerned with the present invention, it has become clear that when a microphase-separated structure as in the present invention is designed in advance as the molecular structure of the photochromic compound, even in a matrix which does not originally have a free space tolerable for revealing the photochromic properties, favorable photochromic properties can be exhibited.

The invention claimed is:

1. A photochromic compound comprising
a polyvalent residue on which
at least one group having a photochromic moiety is substituted,
at least one long-chain group not containing a photochromic moiety and having a molecular weight of 300 or more is further substituted, and
wherein the polyvalent residue is formed of a cyclic molecule, and the cyclic molecule is at least one selected from the group consisting of a cyclodextrin ring, a crown ether, a benzo-crown, a dibenzo-crown, and a dicyclohexano-crown.

2. The photochromic compound according to claim 1, wherein a total number of the group having a photochromic moiety and the number of the long-chain group per molecule of the photochromic compound is from 2 to 30.

3. The photochromic compound according to claim 1, wherein the photochromic moiety has at least one structure selected from the group consisting of naphthopyran, spirooxazine, spiropyran, fulgide, fulgimide, and diarylethene.

4. The photochromic compound according to claim 1, wherein the photochromic moiety is an indeno[2,1-f]naphtho[1,2-b]pyran.

5. The photochromic compound according to claim 1, wherein the group having a photochromic moiety is one represented by the following formula (1) or (1'):

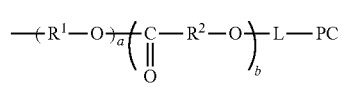
(1)

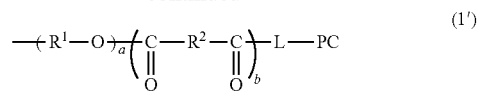
(1')

wherein,
PC is a photochromic group;
$R^1$ is a linear or branched alkylene group having 2 to 8 carbon atoms;
$R^2$ is a linear or branched alkylene group having 2 to 8 carbon atoms, a linear or branched alkylene group having an acetyl group branch and having 3 to 8 carbon atoms, or a linear or branched alkylene group having an ether bond and having 3 to 8 carbon atoms;
L is divalent group represented by the following formula (2):

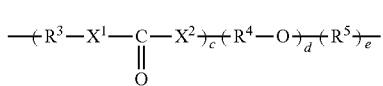
(2)

wherein,
$R^3$ is a single bond, a linear or branched alkylene group having 1 to 20 carbon atoms, a cycloalkylene group having 3 to 12 carbon atoms, or an aromatic group having 6 to 12 carbon atoms;
$R^4$ is a linear or branched alkylene group having 1 to 20 carbon atoms, a cycloalkylene group having 3 to 12 carbon atoms, an aromatic group having 6 to 12 carbon atoms, or a dialkylsilyl group having a linear or branched alkyl group having 1 to 20 carbon atoms;
$R^5$ is a linear or branched alkylene group having 1 to 20 carbon atoms, a cycloalkylene group having 3 to 12 carbon atoms, or an aromatic group having 6 to 12 carbon atoms;
$X^1$ and $X^2$ are each independently a single bond, O, or NH;
c is an integer of 0 to 50, d is an integer of 0 to 50, and e is an integer of 0 or 1;
when c is 2 or more, then divalent groups closed by the parenthesis of "c" may be the same as or different from each other;
when d is 2 or more, then divalent groups closed by the parenthesis of "d" may be the same as or different from each other;
a is an integer of 1 to 50, and b is an integer of 0 to 50;
when a is 2 or more, then divalent groups closed by the parenthesis of "a" may be the same as or different from each other; and
when b is 2 or more, then divalent groups closed by the parenthesis of "b" may be the same as or different from each other.

6. The photochromic compound according to claim 1, wherein the long-chain group is represented by the following formula (3) or (3'):

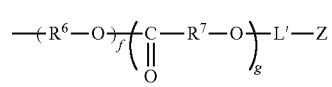
(3)

-continued

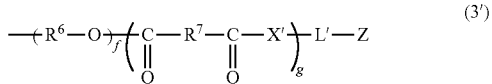
(3')

wherein,
- Z is an alkyl group having 1 to 10 carbon atoms or a polymerizable group;
- $R^6$ is a linear or branched alkylene group having 2 to 8 carbon atoms;
- $R^7$ is a linear or branched alkylene group having 2 to 8 carbon atoms, a linear or branched alkylene group having an acetyl group branch and having 3 to 8 carbon atoms, or a linear or branched alkylene group having an ether bond and having 3 to 8 carbon atoms;
- X' is a single bond, O, or NH; and
- L' is divalent group represented by the following formula (2'):

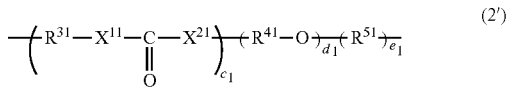
(2')

wherein,
- $R^{31}$ is a single bond, a linear or branched alkylene group having 1 to 20 carbon atoms, a cycloalkylene group having 3 to 12 carbon atoms, or an aromatic group having 6 to 12 carbon atoms;
- $R^{41}$ is a linear or branched alkylene group having 1 to 20 carbon atoms, a cycloalkylene group having 3 to 12 carbon atoms, an aromatic group having 6 to 12 carbon atoms, or a dialkylsilyl group having a linear or branched alkyl group having 1 to 20 carbon atoms;
- $R^{51}$ is a linear or branched alkylene group having 1 to 20 carbon atoms, a cycloalkylene group having 3 to 12 carbon atoms, or an aromatic group having 6 to 12 carbon atoms;
- $X^{11}$ and $X^{21}$ are each independently a single bond, O, or NH;
- $c_1$ is an integer of 0 to 50, $d_1$ is an integer of 0 to 50, and $e_1$ is an integer of 0 or 1;
- when $c_1$ is 2 or more, then divalent groups may be the same as or different from each other;
- when $d_1$ is 2 or more, then divalent groups may be the same as or different from each other;
- f is an integer of 1 to 50, and g is an integer of 0 to 50;
- when f is 2 or more, then divalent groups may be the same as or different from each other; and
- when g is 2 or more, then divalent groups may be the same as or different from each other.

7. The photochromic compound according to claim 1, having a weight molecular weight of 2,000 or more.

8. A curable composition comprising the photochromic compound according to claim 1 and a polymerizable compound.

9. A photochromic cured body obtained by curing the curable composition according to claim 8.

* * * * *